United States Patent
Haghighi et al.

(10) Patent No.: US 12,277,687 B2
(45) Date of Patent: Apr. 15, 2025

(54) SYSTEMS, METHODS, AND APPARATUSES FOR THE USE OF TRANSFERABLE VISUAL WORDS FOR AI MODELS THROUGH SELF-SUPERVISED LEARNING IN THE ABSENCE OF MANUAL LABELING FOR THE PROCESSING OF MEDICAL IMAGING

(71) Applicant: Arizona Board of Regents on Behalf of Arizona State University, Scottsdale, AZ (US)

(72) Inventors: Fatemeh Haghighi, Tempe, AZ (US); Mohammad Reza Hosseinzadeh Taher, Tempe, AZ (US); Zongwei Zhou, Tempe, AZ (US); Jianming Liang, Tempe, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 437 days.

(21) Appl. No.: 17/246,032

(22) Filed: Apr. 30, 2021

(65) Prior Publication Data

US 2021/0343014 A1 Nov. 4, 2021

Related U.S. Application Data

(60) Provisional application No. 63/110,265, filed on Nov. 5, 2020, provisional application No. 63/018,335, filed on Apr. 30, 2020.

(51) Int. Cl.
*G06T 5/77* (2024.01)
*G06T 3/04* (2024.01)
(Continued)

(52) U.S. Cl.
CPC .......... *G06T 5/77* (2024.01); *G06T 3/04* (2024.01); *G06T 7/0014* (2013.01); *G06V 10/25* (2022.01);
(Continued)

(58) Field of Classification Search
CPC ..... G06T 5/005; G06T 3/0012; G06T 7/0014; G06T 2207/20081; G06T 2207/20084; G06V 10/25; G06V 10/82; G06V 10/764
See application file for complete search history.

(56) References Cited

U.S. PATENT DOCUMENTS 8,204,842 B1 6/2012 Zhang et al.
9,811,765 B2 11/2017 Wang et al.
(Continued)

OTHER PUBLICATIONS

Chen et al., Self-supervised learning for medical image analysis using image context restoration, Jul. 2018, IEEE. (Year: 2018).*
(Continued)

*Primary Examiner* — Wednel Cadeau
(74) *Attorney, Agent, or Firm* — Elliott, Ostrander & Preston, P.C.

(57) ABSTRACT

Described herein are means for the generation of semantic genesis models through self-supervised learning in the absence of manual labeling, in which the trained semantic genesis models are then utilized for the processing of medical imaging. For instance, an exemplary system is specially configured with means for performing a self-discovery operation which crops 2D patches or crops 3D cubes from similar patient scans received at the system as input; means for transforming each anatomical pattern represented within the cropped 2D patches or the cropped 3D cubes to generate transformed 2D anatomical patterns or transformed 3D anatomical patterns; means for performing a self-classification operation of the transformed anatomical patterns by formulating a C-way multi-class classification
(Continued)

task for representation learning; means for performing a self-restoration operation by recovering original anatomical patterns from the transformed 2D patches or transformed 3D cubes having transformed anatomical patterns embedded therein to learn different sets of visual representation; and means for providing a semantics-enriched pre-trained AI model having a trained encoder-decoder structure with skip connections in between based on the performance of the self-discovery operation, the self-classification operation, and the self-restoration operation. Other related embodiments are disclosed.

15 Claims, 15 Drawing Sheets

(51) Int. Cl.
 G06T 7/00 (2017.01)
 G06V 10/25 (2022.01)
 G06V 10/764 (2022.01)
 G06V 10/82 (2022.01)
(52) U.S. Cl.
 CPC ............ *G06V 10/764* (2022.01); *G06V 10/82* (2022.01); *G06T 2207/20081* (2013.01); *G06T 2207/20084* (2013.01)

(56) References Cited

U.S. PATENT DOCUMENTS

| | | | |
|---|---|---|---|
| 2018/0196873 A1 | 7/2018 | Yerebakan et al. | |
| 2019/0057774 A1 | 2/2019 | Velez et al. | |
| 2020/0069973 A1* | 3/2020 | Lou | G16H 30/20 |
| 2021/0319556 A1* | 10/2021 | Chauhan | G06T 7/0014 |
| 2022/0309811 A1 | 9/2022 | Haghighi et al. | |

OTHER PUBLICATIONS

Tajbakhsh, N. et al., "Embracing imperfect datasets: A review of deep learning solutions for medical image segmentation," Medical Image Analysis, 60, 2020, p. 101693.

Vincent, P. et al., "Extracting and composing robust features with denoising autoencoders," Proceedings of the 25th International Conference on Machine Learning, 2008, pp. 1096-1103.

Wang, H. et al., "Comparison of machine learning methods for classifying mediastinal lymph node metastasis of non-small cell lung cancer from 18 F-FDG PET/CT images," EJNMMI research 7(1), 2017, pp. 1-11.

Wang, X. et al., "Chestx-ray8: Hospital-scale chest x-ray database and benchmarks on weakly-supervised classification and localization of common thorax diseases," Proceedings of the IEEE Conference on Computer Vision and Pattern Recognition, 2017, pp. 2097-2106.

Wang, Y. et al., "E2-train: Training state-of-the-art CNNs with over 80% energy savings." Advances in Neural Information Processing Systems, 32, 2019.

Wu, B. et al., "Joint learning for pulmonary nodule segmentation, attributes and malignancy prediction," 2018 IEEE 15th International Symposium on Biomedical Imaging (ISBI 2018), 2018, pp. 1109-1113, IEEE.

Yan, X. et al., "Clusterfit: Improving generalization of visual representations," Proceedings of IEEE/CVF Conference on Computer Vision and Pattern Recognition, 2020, pp. 6509-6518.

Yosinski, J. et al., "How transferable are features in deep neural networks?" Advances in neural information processing systems, 27, 2014, pp. 3320-3328.

Yue-Hei Ng, J. et al., "Exploiting local features from deep networks for image retrieval," Proceedings of IEEE Conference on Computer Vision and Pattern Recognition Workshops, 2015, pp. 53-61.

Zhan, X. et al., "Online deep clustering for unsupervised representation learning," Proceedings of IEEE/CVF Conference on Computer Vision and Pattern Recognition, 2020, pp. 6688-6697.

Zhang, L. et al., "Aet vs. aed: Unsupervised representation learning by auto-encoding transformations rather than data," Proceedings of the IEEE/CVF Conference on Computer Vision and Pattern Recognition, 2019, pp. 2547-2555.

Zhang, R. et al., "Colorful image colorization," Computer Vision—ECCV 2016: 14th European Conference, Amsterdam, The Netherlands, Oct. 11-14, 2016, Proceedings, Part III 14, 2016, Springer International Publishing.

Zhou, Z. et al., "Finetuning convolutional neural networks for biomedical image analysis: actively and incrementally," Proceedings of the IEEE Conference on Computer Vision and Pattern Recognition, 2017, pp. 7340-7349.

Zhou, Z. et al., "Models genesis," Medical Image Analysis, vol. 67, 2021, p. 101840.

Zhou, Z. et al., "Models genesis: Generic autodidactic models for 3d medical image analysis," Medical Image Computing and Computer Assisted Intervention—MICCAI 2019: 22nd International Conference, Shenzhen, China, Oct. 13-17, 2019, Proceedings, Part IV 22, 2019, Springer International Publishing.

Zhuang, X. et al., "Self-supervised feature learning for 3d medical images by playing a rubik's cube," Medical Image Computing and Computer Assisted Intervention—MICCAI 2019: 22nd International Conference, Shenzhen, China, Oct. 13-17, 2019, Proceedings, Part IV 22, 2019, Springer International Publishing.

Alex, V. et al., "Semisupervised learning using denoising autoencoders for brain lesion detection and segmentation," Journal of Medical Imaging 4(4), 2017, 041311.

Arandjelovic, R. et al., "Netvlad: Cnn architecture for weakly supervised place recognition," Proceedings of the IEEE Conference on Computer Vision and Pattern Recognition, 2016, pp. 5297-5307.

Ardila, D. et al., "End-to-end lung cancer screening with three-dimensional deep learning on low-dose chest computed tomography," Nature medicine 25(6), 2019, pp. 954-961.

Armato III, S.G. et al., "The lung image database consortium (LIDC) and image database resource initiative (IDRI): a completed reference database of lung nodules on CT scans," Medical physics 38(2), 2011, pp. 915-931.

Bai, W. et al., "Self-supervised learning for cardiac mr image segmentation by anatomical position prediction," Medical Image Computing and Computer Assisted Intervention—MICCAI 2019: 22nd International Conference, Shenzhen, China, Oct. 13-17, 2019, Proceedings, Part II, 2019, pp. 541-549. Springer International Publishing.

Bakas, S. et al., "Identifying the best machine learning algorithms for brain tumor segmentation, progression assessment, and overall survival prediction in the BRATS challenge," arXiv preprint arXiv:1811.02629, 2018.

Bengio, Y. "Learning Deep Architectures for AI", Foundations and Trends in Machine Learning, vol. 2, No. 1, 2009. pp 1-127.

Bilic, P. et al., "The liver tumor segmentation benchmark (lits)," arXiv preprint arXiv:1901.04056, 2019.

Caron, M. et al., "Deep clustering for unsupervised learning of visual features," Proceedings of the European Conference on Computer Vision (ECCV), 2018, pp. 132-149.

Caron, M. et al., "Unsupervised pre-training of image features on non-curated data," Proceedings of the IEEE International Conference on Computer Vision, 2019, pp. 2959-2968.

Carreira, J. et al., "Quo vadis, action recognition? a new model and the kinetics dataset," Proceedings of the IEEE Conference on Computer Vision and Pattern Recognition, 2017, pp. 6299-6308.

Chaitanya, K. et al., "Contrastive learning of global and local features for medical image segmentation with limited annotations," Advances in neural information processing systems 33, 2020, pp. 12546-12558.

Chen, S. et al., Med3d: Transfer learning for 3d medical image analysis. arXiv preprint arXiv:1904.00625, 2019.

Deshpande, A. et al., "Learning large-scale automatic image colorization," Proceedings of the IEEE International Conference on Computer Vision, 2015, pp. 567-575.

(56) References Cited

OTHER PUBLICATIONS

Doersch, C. et al., "Unsupervised visual representation learning by context prediction," Proceedings of the IEEE International Conference on Computer Vision, 2015, pp. 1422-1430.
Feng, Z. et al., "Self-supervised representation learning by rotation feature decoupling," Proceedings of the IEEE Conference on Computer Vision and Pattern Recognition, 2019, pp. 10364-10374.
Gansbeke, W.V. et al., "Scan: Learning to classify images without labels," European conference on computer vision, 2020, pp. 268-285, Springer International Publishing.
Gibson, E. et al., "Automatic multi-organ segmentation on abdominal CT with dense V-networks," IEEE transactions on medical imaging, vol. 37, No. 8, 2018, pp. 1822-1834.
Gibson, E. et al., "Niftynet: a deep-learning platform for medical imaging," Computer methods and programs in biomedicine 158, 2018, pp. 113-122.
Gidaris, S. et al., "Learning representations by predicting bags of visual words," Proceedings of IEEE/CVF Conference on Computer Vision and Pattern Recognition, 2020, pp. 6928-6938.
Gidaris, S. et al., "Unsupervised representation learning by predicting image rotations," arXiv preprint arXiv:1803.07728, 2018.
Gong, Y. et al., "Multi-scale orderless pooling of deep convolutional activation features," Computer Vision—ECCV 2014: 13th European Conference, Zurich, Switzerland, Sep. 6-12, 2014, Proceedings, Part VII 13, 2014, pp. 392-407, Springer International Publishing.
Goyal, P. et al., "Scaling and benchmarking self-supervised visual representation learning," Proceedings of the IEEE/CVF International Conference on Computer Vision, 2019, pp. 6391-6400.
Haghighi, F. et al., "Learning semantics-enriched representation via self-discovery, self-classification, and self-restoration," Medical Image Computing and Computer Assisted Intervention—MICCAI 2020: 23rd International Conference, Lima, Peru, Oct. 4-8, 2020, Proceedings, Part I 23, 2020, pp. 137-147, Springer International Publishing.
Hendrycks, D. et al., "Using self-supervised learning can improve model robustness and uncertainty," Advances in Neural Information Processing Systems, 32, 2019, pp. 15637-15648.
Huh, M. et al., "What makes imagenet good for transfer learning?," arXiv preprint arXiv:1608.08614 (2016).
Isensee, F. et al., "Automated design of deep learning methods for biomedical image segmentation," arXiv preprint arXiv:1904.08128, 2019.
Jenni, S. et al., "Steering self-supervised feature learning beyond local pixel statistics," Proceedings of the IEEE/CVF Conference on Computer Vision and Pattern Recognition, 2020, pp. 6408-6417.
Johnson, T.B. et al., "Training deep models faster with robust, approximate importance sampling," Advances in Neural Information Processing Systems 31, 2018, pp. 7265-7275.
Kim, D. et al., "Learning image representations by completing damaged jigsaw puzzles," 2018 IEEE Winter Conference on Applications of Computer Vision (WACV), 2108, pp. 793-802, IEEE.
Kornblith, S. et al., "Do better imagenet models transfer better?" Proceedings of the IEEE/CVF conference on computer vision and pattern recognition, 2019, pp. 2661-2671.
Larsson, G. et al., "Colorization as a proxy task for visual understanding," Proceedings of the IEEE Conference on Computer Vision and Pattern Recognition, 2017, pp. 6874-6883.
Larsson, G. et al., "Learning representations for automatic colorization," Computer Vision—ECCV 2016: 14th European Conference, Amsterdam, The Netherlands, Oct. 11-14, 2016, Proceedings, Part IV, 2016, pp. 577-593, Springer International Publishing.
Lowe, D. G., "Distinctive image features from scale-invariant keypoints," International Journal of Computer Vision, 60, 2004, pp. 91-110.

Minderer, M. et al., "Automatic shortcut removal for self-supervised representation learning," International Conference on Machine Learning. PMLR, 2020, pp. 6927-6937.
Mundhenk, T. N. et al., "Improvements to context based self-supervised learning." Proceedings of the IEEE Conference on Computer Vision and Pattern Recognition, 2018, pp. 9339-9348.
Newell, A. et al., "How useful is self-supervised pretraining for visual tasks?" Proceedings of the IEEE/CVF Conference on Computer Vision and Pattern Recognition, 2020, pp. 7345-7354.
Neyshabur, B. et al., "What is being transferred in transfer learning?" Advances in neural information processing systems 33, 2020, pp. 512-523.
Noroozi, M. et al., "Unsupervised learning of visual representations by solving jigsaw puzzles," European Conference on Computer Vision, 2016, pp. 69-84, Springer International Publishing.
Pathak, D. et al., "Context encoders: Feature learning by inpainting," Proceedings of the IEEE Conference on Computer Vision and Pattern Recognition, 2016, pp. 2536-2544.
Raghu, M. Zhang, J. Kleinberg, and S. Bengio, "Transfusion: Understanding transfer learning with applications to medical imaging," arXiv preprint arXiv:1902.07208, 2019.
Ross, T. et al., "Exploiting the potential of unlabeled endoscopic video data with self-supervised learning," International journal of computer assisted radiology and surgery 13(6), 2018, pp. 925-933.
Sabokrou, M. et al., "Self-supervised representation learning via neighborhood-relational encoding," Proceedings of IEEE/CVF International Conference on Computer Vision, 2019, pp. 8010-8019.
Setio, A.A.A. et al., "Validation, comparison, and combination of algorithms for automatic detection of pulmonary nodules in computed tomography images: the LUNA16 challenge," Medical image analysis 42, 2017, pp. 1-13.
Siim-acr pneumothorax segmentation (2019), https://www.kaggle.com/c/siim-acr-pneumothorax-segmentation/.
Simonyan, K. et al., "Very deep convolutional networks for large-scale image recognition," arXiv preprint arXiv:1409.1556, 2014.
Simpson, A.L. et al., "A large annotated medical image dataset for the development and evaluation of segmentation algorithms," arXiv preprint arXiv:1902.09063, 2019.
Sivic, J. et al., "Video google: a text retrieval approach to object matching in videos," Proceedings ninth IEEE international conference on computer vision, 2003, pp. 1470-1477, IEEE.
Tajbakhsh, N. et al., "Computer-aided pulmonary embolism detection using a novel vessel-aligned multi-planar image representation and convolutional neural networks," Medical Image Computing and Computer-Assisted Intervention—MICCAI 2015: 18th International Conference, Munich, Germany, Oct. 5-9, 2015, Proceedings, Part II 18, 2015, pp. 62-69, Springer International Publishing.
Tajbakhsh, N. et al., "Convolutional neural networks for medical image analysis: Full training or fine tuning?," IEEE transactions on medical imaging, vol. 35, No. 5, 2016, pp. 1299-1312.
Non-Final Office Action for U.S. Appl. No. 17/676,134, mailed Aug. 13, 2024, 14 pages.
Fan, Z., et al., "A Generic Unified Deep Model for Learning from Multiple Tasks," 34 pages.
Guo, Z., et al., "Discriminative, Restorative, and Adversarial Learning: Stepwise Incremental Pretraining," 15 pages.
Haghighi, F., et al., "DiRA: Discriminative, Restorative, and Adversarial Learning for Self-supervised Medical Image Analysis," In Proceedings of the IEEE/CVF Conference on Computer Vision and Pattern Recognition (2022), pp. 20792-20802.
Haghighi, F., et al., Transferable Visual Worlds, IEEE Transactions on Medical Imaging, 2020, 21 pages.
Taher, M.R.H., et al., "CAiD: A Self-supervised Learning Framework for Empowering Instance Discrimination in Medical Imaging," Proceedings of Machine Learning Research, 2022, 20 pages.

\* cited by examiner

Local Pixel Shuffling Transformation - 182

Table 1 - 200

| Code 201 | Application 202 | Object 203 | Modality 204 | Dataset 205 |
|---|---|---|---|---|
| NCC 206 | Lung Nodule false positive reduction | Lung Nodule | CT | LUNA-2016 |
| NCS 207 | Lung Nodule Segmentation | Lung Nodule | CT | LIDC-IDRI |
| NCS 208 | Liver segmentation | Liver | CT | LiTS-2017 |
| BMS 209 | Brain Tumor Segmentation | Brain Tumor | MRI | BraTS2018 |
| DXC 210 | Fourteen Thorax Diseases classification | Thorax Diseases | X-ray | ChestX-Ray14 |
| PXS 211 | Pneumothorax Segmentation | Pneumothorax | X-ray | SIIM-ACR PS-2019 |

FIG. 2

Table 2 - 400

| Pre-training 401 | Initialization 402 | NCC (AUC%) 403 | LCS (IoU%) 404 | NCS (IoU%) 405 | BMS (IoU%) 406 |
|---|---|---|---|---|---|
| | Random 409 | 94.25±5.07 | 74.60±4.57 | 74.05±1.97 | 59.87±4.04 |
| Supervised 407 | NiftyNet 410 | 94.14±4.57 | 83.23±1.05 | 52.98±2.05 | 60.78±1.60 |
| | MedicalNet 411 | 95.80±0.51 | 83.32±0.85 | 75.68±0.32 | 66.09±1.35 |
| | Inflated 3D (I3D) 412 | 98.26±0.27 | 70.65±4.26 | 71.31±0.37 | 67.83±0.75 |
| Self-supervised 408 | Autoencoder 413 | 88.43±10.25 | 78.16±2.07 | 75.10±0.91 | 56.36±5.32 |
| | In-painting 414 | 91.46±2.97 | 81.36±4.83 | 75.86±0.26 | 61.38±3.84 |
| | Patch-shuffling 415 | 91.93±2.32 | 82.82±2.35 | 75.74±0.51 | 52.95±6.92 |
| | Rubik's Cube 416 | 95.56±1.57 | 76.07±0.20 | 70.37±1.13 | 62.75±1.93 |
| | Self-restoration 417 | 98.07±0.59 | 78.78±3.11 | 77.41±0.40 | 67.96±1.29 |
| | Self-classification 418 | 97.41±0.32 | 83.61±2.19 | 76.23±0.42 | 66.02±0.83 |
| | Semantic Genesis 3D 419 | 98.47±0.22 | 85.60±1.94 | 77.24±0.68 | 68.80±0.30 |

Best Approaches 420

No statistically significant difference at p = 0.05 — 421

Start
↓

Performing self-supervised learning for an AI model in the absence of manually labeled input, via the following operations:
605

↓

Performing a self-discovery operation which crops 2D patches or crops 3D cubes from similar patient scans received at the system as input.
610

↓

Transforming each anatomical pattern represented within the cropped 2D patches or the cropped 3D cubes to generate transformed 2D anatomical patterns or transformed 3D anatomical patterns.
615

↓

Performing a self-classification operation of the transformed anatomical patterns by formulating a C-way multi-class classification task for representation learning.
620

↓

Performing a self-restoration operation by recovering original anatomical patterns from the transformed 2D patches or transformed 3D cubes having transformed anatomical patterns embedded therein to learn different sets of visual representation.
625

↓

Providing a semantics-enriched pre-trained AI model having a trained encoder-decoder structure with skip connections in between based on the performance of the self-discovery operation, the self-classification operation, and the self-restoration operation.
630

↓

End

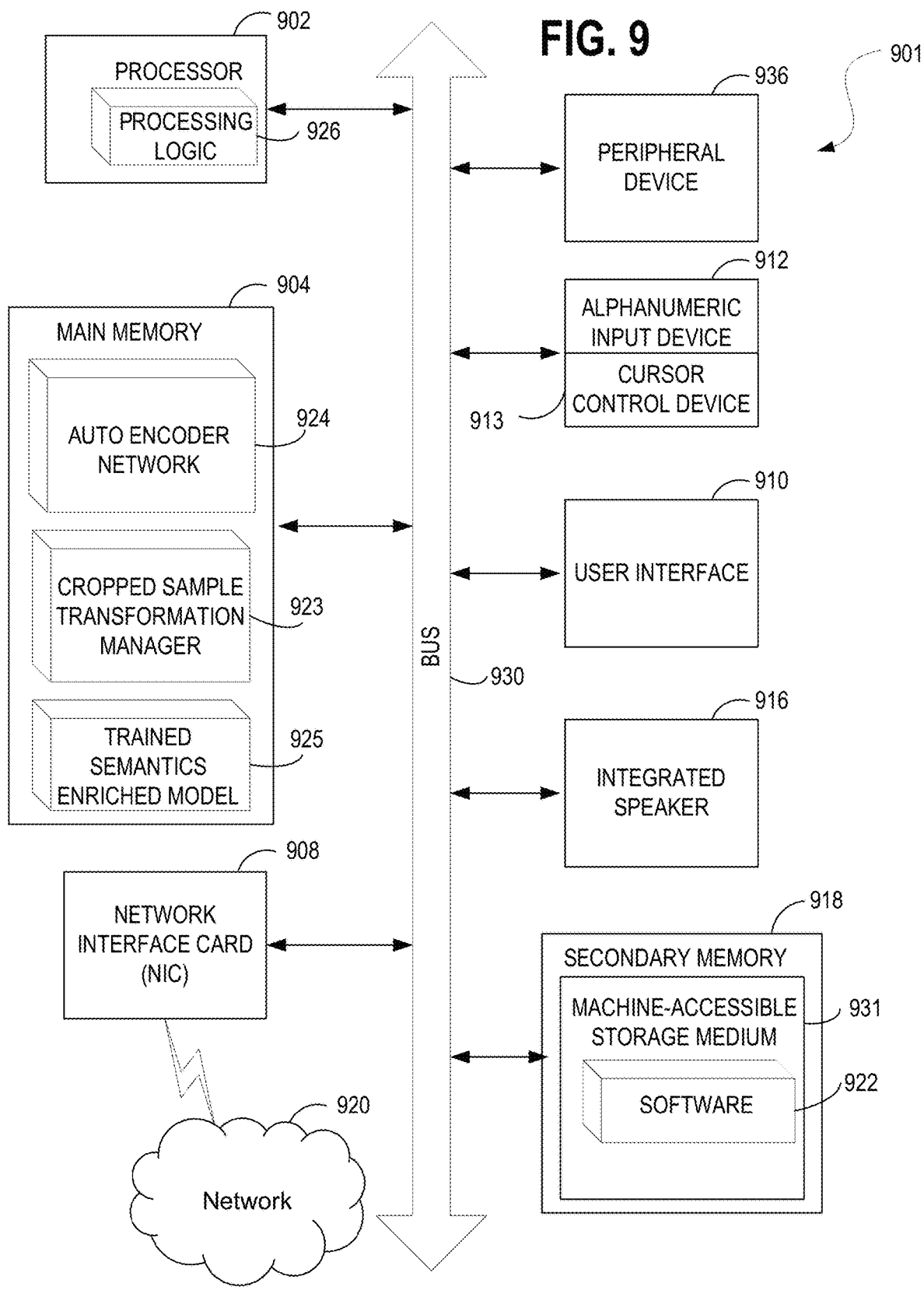

SYSTEMS, METHODS, AND APPARATUSES FOR THE USE OF TRANSFERABLE VISUAL WORDS FOR AI MODELS THROUGH SELF-SUPERVISED LEARNING IN THE ABSENCE OF MANUAL LABELING FOR THE PROCESSING OF MEDICAL IMAGING

CLAIM OF PRIORITY

This U.S. Utility non-provisional patent application is related to, and claims priority to, the U.S. provisional patent application No. 63/018,335, filed Apr. 30, 2020, entitled "SYSTEMS, METHODS, AND APPARATUSES FOR THE GENERATION OF SEMANTIC GENESIS MODELS THROUGH SELF-SUPERVISED LEARNING IN THE ABSENCE OF MANUAL LABELING FOR THE PROCESSING OF MEDICAL IMAGING,", and is further related to, and claims priority to, the U.S. provisional patent application No. 63/110,265, filed Nov. 5, 2020, entitled "SYSTEMS, METHODS, AND APPARATUSES FOR THE USE OF TRANSFERABLE VISUAL WORDS FOR AI MODELS THROUGH SELF-SUPERVISED LEARNING IN THE ABSENCE OF MANUAL LABELING FOR THE PROCESSING OF MEDICAL IMAGING,", the entire contents of each being incorporated herein by reference as though set forth in full.

GOVERNMENT RIGHTS AND GOVERNMENT AGENCY SUPPORT NOTICE

This invention was made with government support under R01 HL128785 awarded by the National Institutes of Health. The government has certain rights in the invention.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of medical imaging and analysis using convolutional neural networks for the classification and annotation of medical images, and more particularly, to systems, methods, and apparatuses for the generation of semantic genesis models through self-supervised learning in the absence of manual labeling and further for the use of transferable visual words for AI models through self-supervised learning in the absence of manual labeling for the processing of medical imaging, in which the trained semantic genesis models and the trained AI models are then utilized for the processing of medical imaging.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Machine learning models have various applications to automatically process inputs and produce outputs considering situational factors and learned information to improve output quality. One area where machine learning models, and neural networks in particular, provide high utility is in the field of processing medical images.

Within the context of machine learning and with regard to deep learning specifically, a Convolutional Neural Network (CNN, or ConvNet) is a class of deep neural networks, very often applied to analyzing visual imagery. Convolutional Neural Networks are regularized versions of multilayer perceptrons. Multilayer perceptrons are fully connected networks, such that each neuron in one layer is connected to all neurons in the next layer, a characteristic which often leads to a problem of overfitting of the data and the need for model regularization. Convolutional Neural Networks also seek to apply model regularization, but with a distinct approach. Specifically, CNNs take advantage of the hierarchical pattern in data and assemble more complex patterns using smaller and simpler patterns. Consequently, on the scale of connectedness and complexity, CNNs are on the lower extreme.

Heretofore, self-supervised learning has been sparsely applied in the field of medical imaging. Nevertheless, there is a massive need to provide automated analysis to medical imaging with a high degree of accuracy so as to improve diagnosis capabilities, control medical costs, and to reduce workload burdens placed upon medical professionals.

Not only is annotating medical images tedious and time-consuming, but it also demands costly, specialty-oriented expertise, which is not easily accessible. To address this challenge, a new framework is newly introduced herein and described in greater detail below, which is configured to train deep models to learn semantically enriched visual representation by self-discovery, self-classification, and self-restoration of the anatomy underneath medical images, resulting in a semantics-enriched, general-purpose, pre-trained 3D model, named Semantic Genesis. In such a way, the resulting pre-trained 3D models (e.g., the Semantic Genesis models) are provided to subsequent users who may further configure the models for their specific implementation needs, such as performing an application specific target-task.

Medical images are naturally associated with rich semantics about the human anatomy, reflected in an abundance of recurring anatomical patterns, offering unique potential to foster deep semantic representation learning and yield semantically more powerful models for different medical applications. But how exactly such strong yet free semantics embedded in medical images can be harnessed for self-supervised learning remains largely unexplored.

Problematically, annotating medical imaging is tedious and time-consuming, and demands costly, specialty-oriented knowledge and skills, which are not easily accessible. Furthermore, any misdiagnosis from failure to recognize or correctly identify anatomical structures and abnormalities may result in potentially devastating impacts on patient morbidity and mortality.

Semantic Genesis is pre-trained by self-supervision and outperforms competing and prior known pre-trained models by either self-supervision or full-supervision in six target tasks, covering both classification and segmentation in various medical modalities (e.g., CT, MRI, and X-ray). Extensive experimentation demonstrates that the resulting Semantic Genesis models significantly exceeds all of known 3D counterparts as well as the de-facto ImageNet-based transfer learning in 2D, attributable to the use of the novel self-supervised learning framework as described in greater detail below, which encourages deep models to learn compelling semantic representation from abundant anatomical patterns resulting from consistent anatomies embedded in medical images.

The present state of the art may therefore benefit from the systems, methods, and apparatuses for the generation of AI models, including semantic genesis models, through self-supervised learning, without requiring any manual labeling, as is described herein.

BRIEF DESCRIPTION OF THE DRAWINGS

Embodiments are illustrated by way of example, and not by way of limitation, and can be more fully understood with reference to the following detailed description when considered in connection with the figures in which:

FIGS. 1D, 1E, 1F, and 1G depict exemplary transformations by which to transform an original input image, in accordance with described embodiments;

FIG. 2 depicts Table 1 which describes the evaluation of the learned representation by fine-tuning it for six publicly-available medical imaging applications including 3D and 2D image classification and segmentation tasks, across diseases, organs, datasets, and modalities, in accordance with described embodiments;

FIG. 4 depicts Table 2 which shows fine-tuning from Semantic Genesis outperforms learning 3D models from scratch as well as three competing publicly available (fully) supervised pre-trained 3D models and four self-supervised learning approaches in four medical target tasks, in accordance with described embodiments;

FIG. 6 depicts a flow diagram illustrating a method for the generation of semantic genesis models through self-supervised learning in the absence of manual labeling, in which the trained semantic genesis models are then utilized for the processing of medical imaging, in accordance with disclosed embodiments;

FIG. 9 illustrates a diagrammatic representation of a machine in the exemplary form of a computer system, in accordance with one embodiment.

DETAILED DESCRIPTION

Figure 1A:
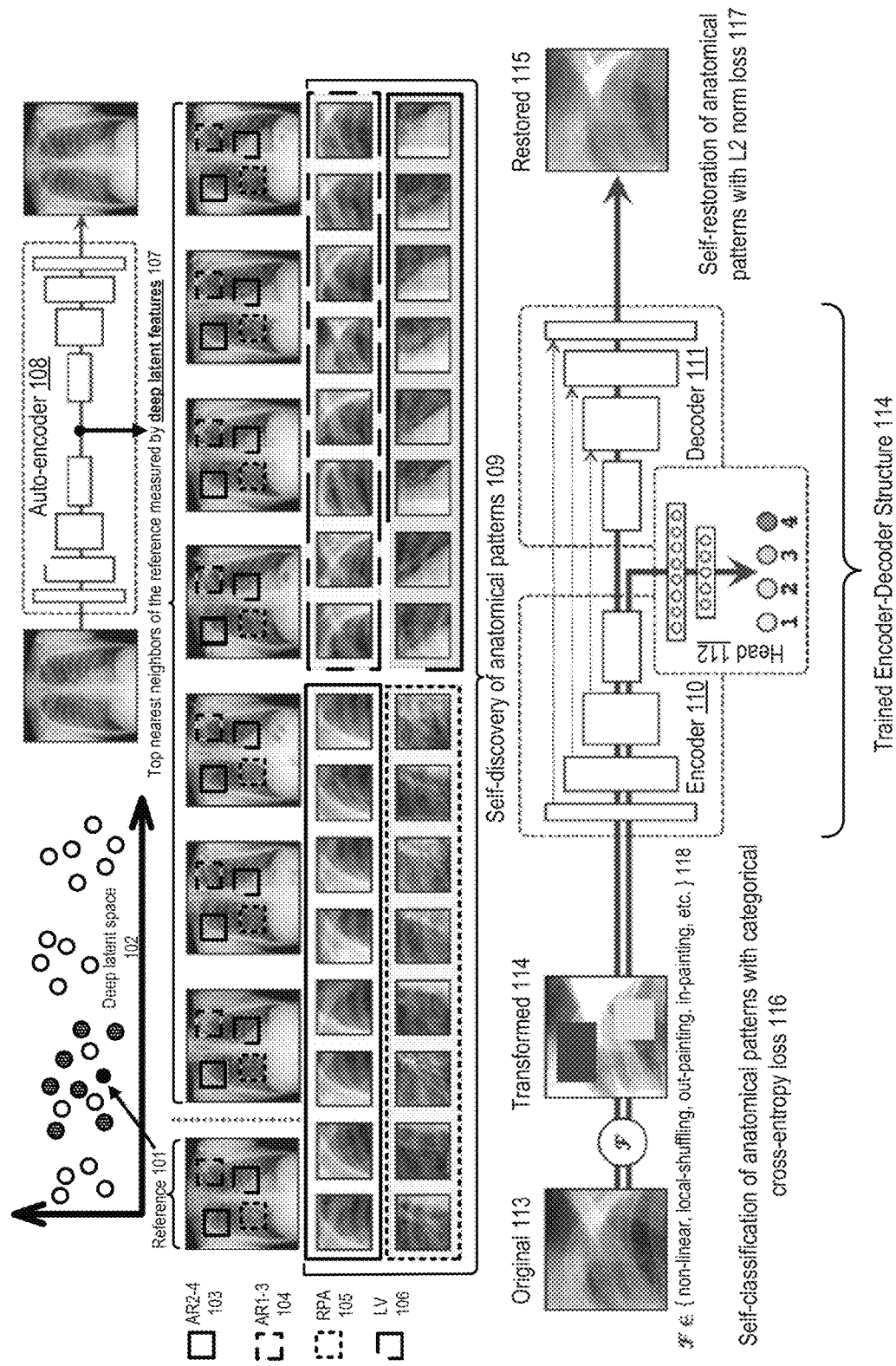
FIG. 1A depicts a self-supervised learning framework consisting of three sub-parts including (a) self-discovery of anatomical patterns, (b) self-classification of anatomical patterns with categorical cross-entropy loss, and (c) self-restoration of anatomical patterns with L2 norm loss, in accordance with described embodiments.

Described herein are systems, methods, and apparatuses for the generation of AI models, including semantic genesis models, through self-supervised learning in the absence of manual labeling, in which the trained semantic genesis models are then utilized in the context of medical imaging.

Self-supervised learning methods aim to learn general image representation from unlabeled data. A known difficulty with prior known techniques utilizing self-supervised learning is how to best "extract" proper supervision signals from the unlabeled data directly. In large part, self-supervised learning approaches involve predicting some hidden properties of the data, utilizing techniques such as colorization, jigsaw, and rotation. However, the most prominent prior known methods were derived in the context of natural images, without considering the unique properties that medical imaging has to offer.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a specialized and special-purpose processor having been programmed with the instructions to perform the operations described herein. Alternatively, the operations may be performed by a combination of hardware and software. In such a way, the embodiments of the invention provide a technical solution to a technical problem.

Embodiments also relate to an apparatus for performing the operations disclosed herein. This apparatus may be specially constructed for the required purposes, or it may be a special purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

While the algorithms and displays presented herein are not inherently related to any particular computer or other apparatus, they are specially configured and implemented via customized and specialized computing hardware which is specifically adapted to more effectively execute the novel algorithms and displays which are described in greater detail below. Various customizable and special purpose systems may be utilized in conjunction with specially configured programs in accordance with the teachings herein, or it may prove convenient, in certain instances, to construct a more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

In addition to various hardware components depicted in the figures and described herein, embodiments further include various operations which are described below. The operations described in accordance with such embodiments may be performed by hardware components or may be embodied in machine-executable instructions, which may be used to cause a special-purpose processor programmed with the instructions to perform the operations. Alternatively, the operations may be performed by a combination of hardware and software, including software instructions that perform the operations described herein via memory and one or more processors of a computing platform.

FIG. 1A depicts a self-supervised learning framework consisting of three sub-parts including (a) self-discovery of anatomical patterns at element 109, (b) self-classification of anatomical patterns with categorical cross-entropy loss at element 116, and (c) self-restoration of anatomical patterns with L2 norm loss as depicted at element 117.

Application of the three sub-parts, (a) self-discovery at element 109, (b) self-classification at element 116, and (c) self-restoration at element 117, results in the semantics-enriched pre-trained models, also referred to as "Semantic Genesis" or "Semantic Genesis models," providing a trained encoder-decoder structure 114 with skip connections in between and a classification head 112 at the end of the encoder 110, preceding the decoder 111 portion of the trained encoder-decoder structure 114.

For example, given a random reference patient (element 101), similar patients are found within the deep latent space 102 and identified based on deep latent features. Further processing crops anatomical patterns from random yet fixed coordinates, and assigns the pseudo labels to the cropped anatomical patterns according to their coordinates. For instance, the top nearest neighbors of the reference patient are measured via their deep latent features that are extracted using an auto-encoder model 108 (e.g., refer to element 107 corresponding to boxed images in the middle row to the right of the reference patient's boxed image at element 101).

For simplicity and clarity, there are depicted here four coordinates in X-ray images as an example, specifically coordinate AR2-4 at element 103, coordinate AR1-3 at element 104, coordinate RPA at element 105, and coordinate LV at element 106. However, a different quantity of coordinates is permissible and expected. The input to the model as shown here is a transformed anatomical pattern crop 114, and the model is trained to classify the pseudo label and to recover the original crop 113, depicted here as the "restored" crop at element 115. In such a way, the model aims to acquire semantics-enriched representation, producing more powerful application-specific target models.

In the context of medical imaging specifically, protocols must be followed for defined clinical purposes, so as to appropriately generate images of similar anatomies across patients and yielding recurrent anatomical patterns across images.

These recurring patterns are associated with rich semantic knowledge about the human body, thus offering great potential to foster deep semantic representation learning and produce more powerful models for various medical applications.

However, prior known techniques have yet to successfully exploit the deep semantics associated with recurrent anatomical patterns embedded in medical images to enrich representation learning.

Thus, a novel self-supervised learning method is described herein which overcomes shortcomings in the prior known techniques, with the novel self-supervised learning method enabling the capture of semantics-enriched representation from unlabeled medical image data, resulting in a set of powerful pre-trained models.

The resulting pre-trained models are Semantic Genesis because they represent a significant advancement from Models Genesis by introducing two novel components: self-discovery (element 109) and self-classification (element 116) of the anatomy underneath medical images.

Specifically, the unique self-classification (element 116) branch of the diagram, with a small computational overhead, compels the model to learn semantics from consistent and recurring anatomical patterns discovered during the self-discovery (element 109) phase, while Models Genesis learns representation from random sub-volumes with no semantics as no semantics can be discovered from random sub-volumes.

Extensive experimental results, described below, demonstrate that learning semantics enriches the existing self-supervised learning approaches (refer to FIG. 2 below) and additionally demonstrates that Semantic Genesis not only offers performance superior to its self-supervised learning counterparts, but it also exceeds fully supervised pre-trained 3D models, as is detailed below at Table 2. Further still, experimental results demonstrate that Semantic Genesis consistently tops any 2D approaches (refer to FIG. 3 below).

These performance improvements are attributable to the semantics derived from the consistent and recurrent anatomical patterns. Not only can the consistent and recurrent anatomical patterns be automatically discovered from medical images, but they further serve as strong yet free supervision signals for deep models to learn more semantically enriched representation automatically via self-supervision.

By explicitly employing the strong yet free semantic supervision signals, Semantic Genesis distinguishes itself from all existing works, including techniques for de-noising images by a stack of de-noising auto-encoders, techniques for colorization of colonoscopy images, techniques for context restoration, techniques for solving a Rubik's cube, and techniques for predicting anatomical positions within Magnetic Resonance (MR) images.

While prior known techniques may learn common anatomical representation from unlabeled data, the semantics associated with the anatomical patterns embedded in such medical images has not yet been successfully exploited by any prior known technique.

Semantic Genesis: Further detailed within FIG. 1A is the self-supervised learning framework, which enables training Semantic Genesis from scratch on unlabeled medical images, thus wholly negating the need for costly and expensive and time-consuming curation of such medical images. At a high level, Semantic Genesis operates via an encoder-decoder structure 114 with skip connections in between and a classification head 112 at the end of the encoder 110.

The objective for the model is to learn semantics-enriched representation from multiple perspectives. In doing so, the described framework consists of the three above referenced sub-components components, specifically, the self-discovery sub-component at element 109 which provides self-discovery of anatomical patterns from similar patients, the self-classification sub-component at element 116 which provides self-classification of the patterns, and the self-restoration sub-component at element 117 which operates to perform self-restoration of the transformed patterns so as to render the "restored" image crop depicted at element 115.

According to particular embodiments, once the self-discovered anatomical pattern set is built, the classification and restoration branches are jointly trained together in the model.

Self-discovery of anatomical patterns: According to another embodiment, processing begins by building a set of anatomical patterns from medical images, as illustrated at FIG. 1A, via the self-discovery sub-component at element 109. An auto-encoder network is first trained with training data to extract deep features of each patient scan, which learns an identical mapping from scan to itself. Once trained, a latent representation vector from the auto-encoder may be used as an indicator of each patient.

In such an embodiment, one patient is randomly anchored as a reference 101 and further processing then searches for the nearest neighbors (refer to element 107) to the randomly anchored patient through the entire dataset by computing an L2 distance of the latent representation vectors, resulting in a set of similar patients in appearance.

Due to the consistent and recurring anatomies across these patients, that is, each coordinate contains a unique anatomical pattern, it is thus feasible to extract similar anatomical patterns according to the coordinates.

In such a way, patches for 2D images and cubes for 3D images are cropped from C number of random but fixed coordinates across a potentially small set of discovered patients, which share similar semantics. Such, processing computes similarity at the patient-level rather than the pattern-level to promote balance between the diversity and consistency of anatomical patterns. Further processing then assigns pseudo labels to cropped patches/cubes based on their coordinates, resulting in a new dataset, in which each case is associated with one of the C classes.

The extracted anatomical patterns are naturally associated with the semantics of the corresponding human body parts.

For example, four pseudo labels are depicted at FIG. 1A as noted above, each of which are defined randomly in the reference patient (top-left most at element 101), but as seen, each carries local anatomical information, shown here as (element 103) anterior ribs 2 through 4, (element 104) anterior ribs 1 through 3, (element 105) right pulmonary artery, and (element 106) Left Ventricle (LV).

Figure 1B:
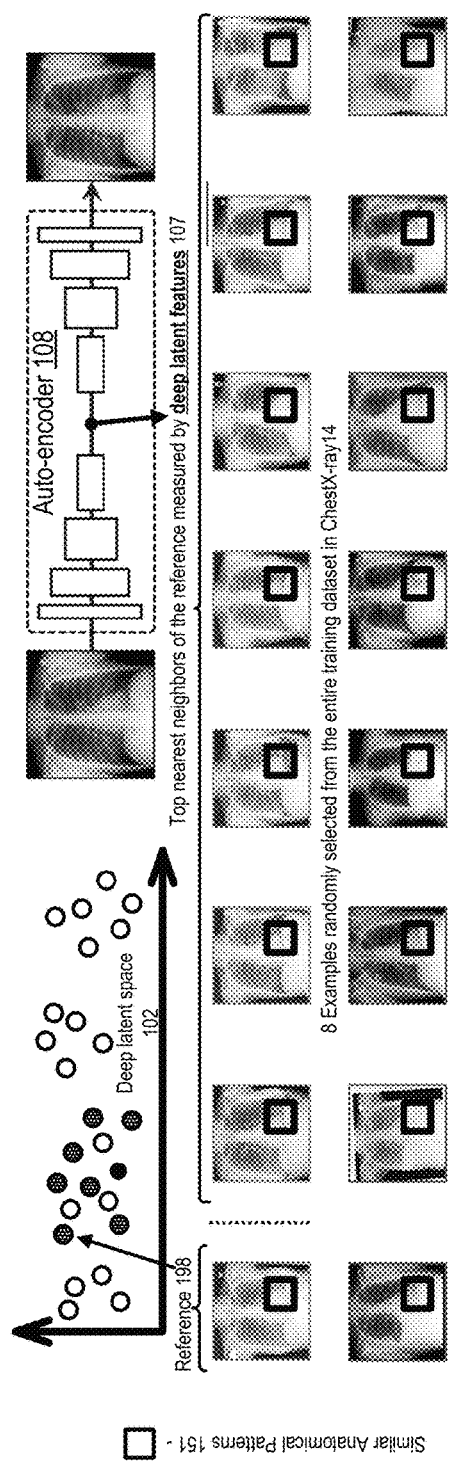
FIGS. 1B and 1C depict additional examples of applying the self-discovery process to discover similar anatomical patterns, in accordance with described embodiments.
Figure 1C:
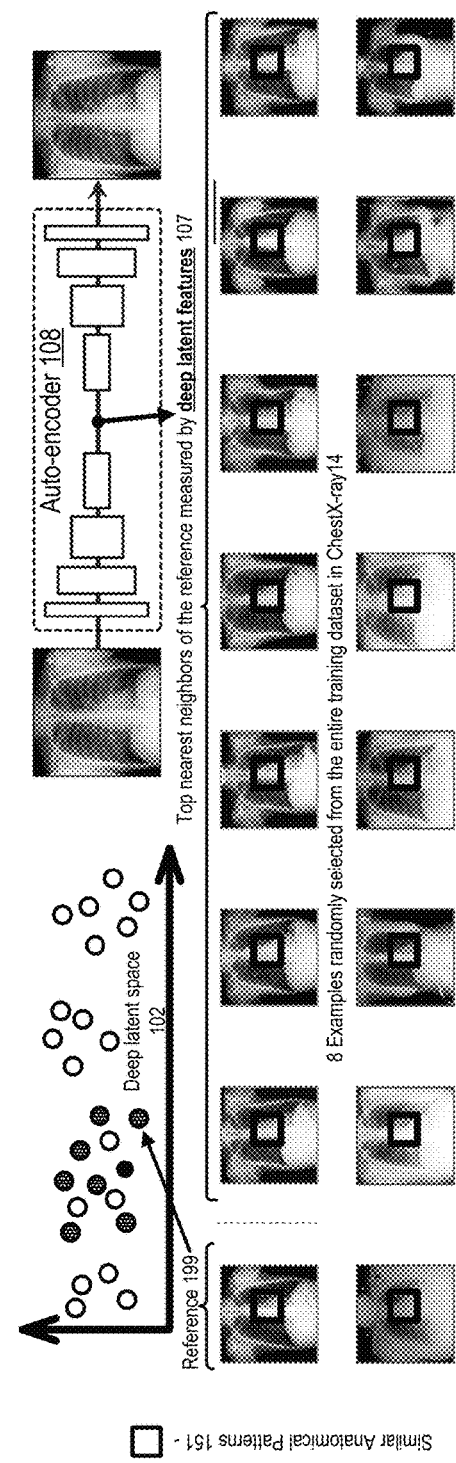

FIGS. 1B and 1C depict additional examples of applying the self-discovery process to discover similar anatomical patterns.

By repeating the above self-discovery process, an enormous quantity of anatomical patterns associated with their pseudo labels are automatically generated for use with subsequent representation learning in the following stages.

The self-discovery process aims to automatically discover similar anatomical patterns 151 across patients, as illustrated by way of the inset black framed boxes within the patient images at each of FIGS. 1B and 1C. Patches extracted at the same coordinate across patients may be very different. For instance, the inset black framed boxes at FIG. 1B are readily distinguishable from the inset black framed boxes of the patients at FIG. 1C and moreover, are located in different areas of the chest x-ray images provided. These differences in the images are overcome by first computing similarity at the patient level using the deep latent features from an auto-encoder and then selecting the top nearest neighbors of the reference patient. For instance refer to the top row of FIG. 1B in which the top nearest neighbors for the reference image 198 are measured by deep latent features 107 and correspondingly, refer to the top row of FIG. 1C in which the top nearest neighbors for the reference image 199 are measured by deep latent features 107.

Extracting anatomical patterns from these similar patients (refer to similar anatomical patterns 151 at each of FIGS. 1B and 1C strikes a balance between consistency and diversity in pattern appearance for each anatomical pattern.

Self-classification of anatomical patterns: After self-discovery of a set of anatomical patterns, the representation learning is formulated as a simple C-way multi-class classification task. The goal of this task is to encourage models to learn from the recurrent anatomical patterns across patient images, fostering a deep semantically enriched representation.

As is further depicted by FIG. 1A at the self-classification sub-component depicted at element 116, the classification branch encodes the original 113 input anatomical pattern into a latent space, followed by a sequence of fully-connected (fc) layers, and predicts the pseudo label associated with the pattern.

A categorical cross-entropy loss function is adopted classify the anatomical patterns, as follows:

$$\mathcal{L}_{cls} = -\frac{1}{N}\sum_{b=1}^{N}\sum_{c=1}^{C} \mathcal{Y}_{bc}\log\mathcal{P}_{bc},$$

where N denotes the batch size; C denotes the number of classes; Y and P represent the ground truth (one-hot pseudo label vector) and the prediction, respectively.

Figure 1D:
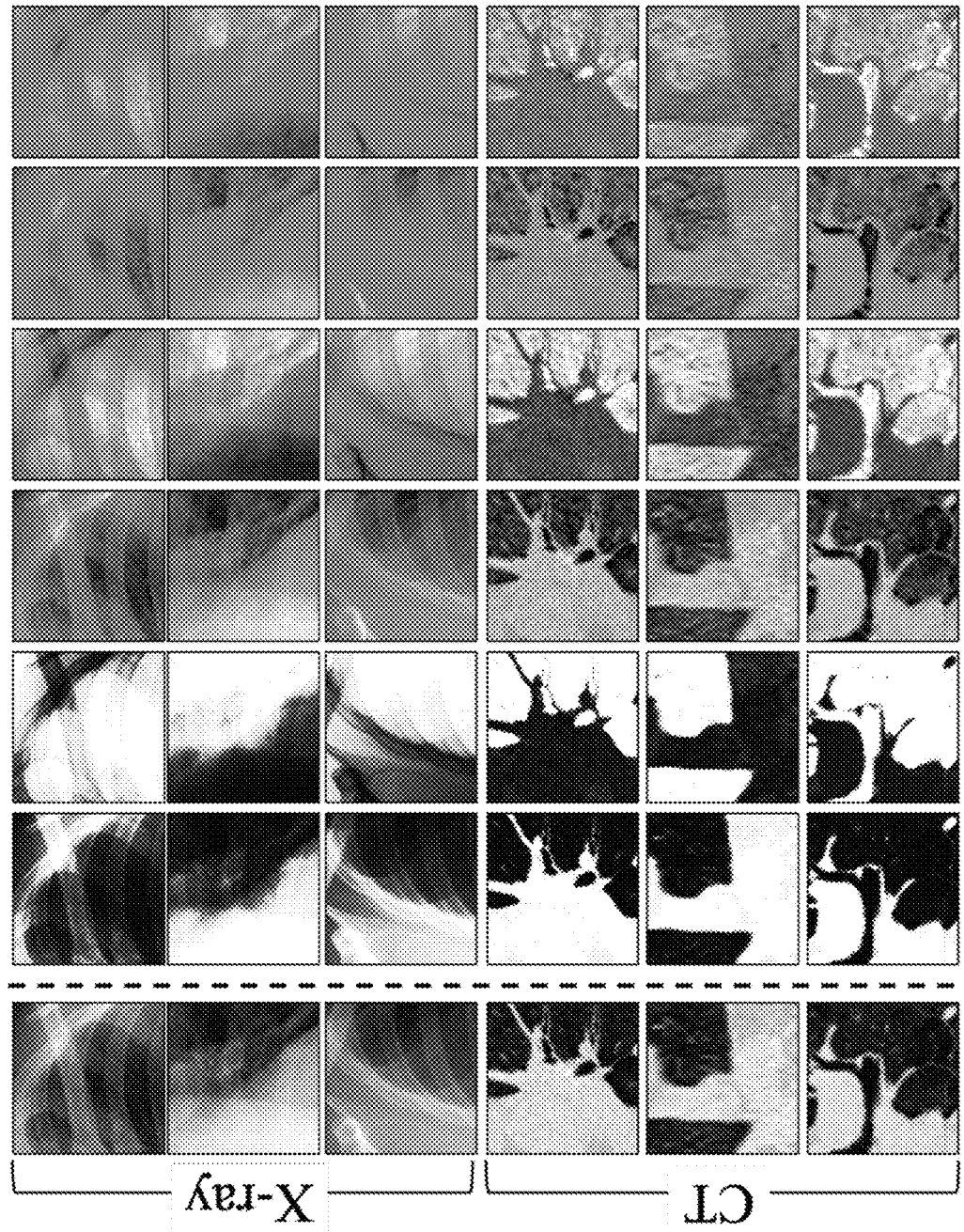
Figure 1E:
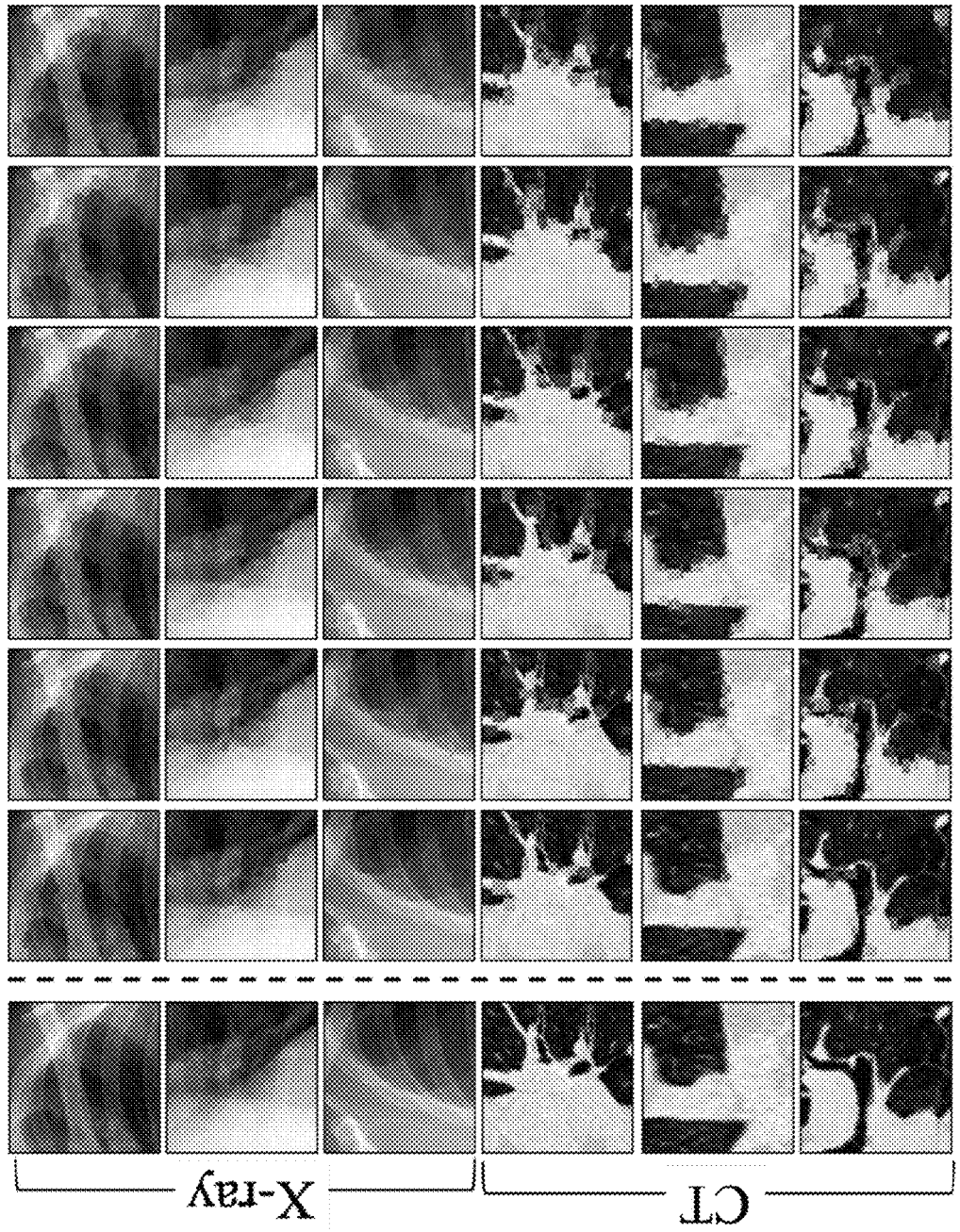
Figure 1F:
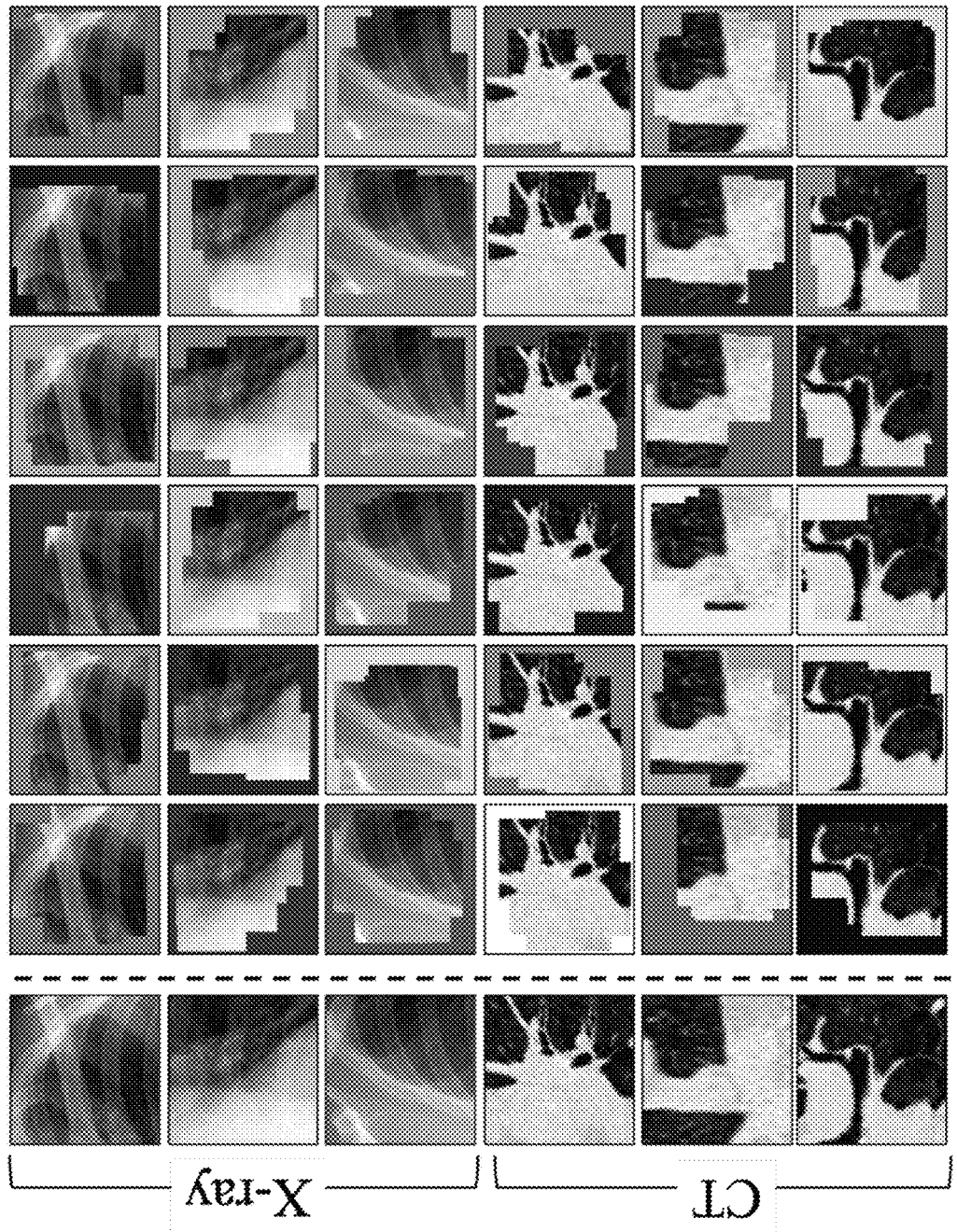

FIGS. 1D, 1E, 1F, and 1G depict exemplary transformations by which to transform an original input image, in accordance with described embodiments. In particular, FIG. 1D depicts an exemplary non-linear transformation 181 as applied to both X-ray and CT input images. FIG. 1E depicts an exemplary local pixel shuffling transformation 182 as applied to both X-ray and CT input images. FIG. 1F depicts an exemplary out-painting transformation 182 as applied to both X-ray and CT input images. Lastly, FIG. 1G depicts an exemplary in-painting transformation 184 as applied to both X-ray and CT input images.

Self-restoration of anatomical patterns: The objective of self-restoration is for the model to learn different sets of visual representation by recovering original anatomical patterns from the transformed ones. According to an exemplary embodiment, four transformations are adopted, specifically, non-linear 181, local-shuffling 182, out-painting 183, and in-painting 184, as depicted by element 118 at FIG. 1A and as further presented at elements 181-184 of FIGS. 1D, 1E, 1F, and 1G, respectively.

As is further depicted by FIG. 1A at the self-classification sub-component depicted at element 117, the restoration branch encodes the input transformed anatomical pattern into a latent space and decodes back to the original resolution, with an aim to recover the original anatomical pattern 113 from the transformed one 114, resulting in the restored pattern 115. So as to permit the Semantic Genesis to restore 115 the transformed anatomical patterns 114, processing computes an L2 distance between the original pattern 113 and the reconstructed pattern via the following loss function:

$$\mathcal{L}_{rec} = \frac{1}{N}\sum_{i=1}^{N} \|\chi_i - \chi'_i\|_2.$$

where N denotes the batch size, X and X' represent the ground truth (original anatomical pattern 113) and the reconstructed prediction, respectively.

According to exemplary embodiments, during training, a multi-task loss function is defined on each transformed anatomical pattern as $L=\lambda_{cls}L_{cls}+\lambda_{rec}L_{rec}$, where $\lambda_{cls}$ and $\lambda_{rec}$ regulate the weights of classification and reconstruction losses, respectively.

The definition of $L_{cls}$ allows the model to learn more semantically enriched representation while the definition of $L_{rec}$ encourages the model to learn from multiple perspectives by restoring original images 113 from varying image deformations 114. Once trained, the encoder alone can be fine-tuned for target classification tasks; while the encoder and decoder together can be fine-tuned for target segmentation tasks to fully utilize the advantages of the pre-trained models on the target tasks.

Experimental Pre-training Semantic Genesis: Experiments conducted utilize the Semantic Genesis 3D and 2D which are self-supervised pre-trained from 623 CT scans in LUNA-2016 dataset and 75,708 X-ray images from the ChestX-ray14 dataset.

While Semantic Genesis is trained from only unlabeled images, test images in those datasets are not utilized so as to avoid test-image leaks between proxy and target tasks.

In the self-discovery process, the top K most similar cases (see FIG. 1A, element 107) are selected for the reference patient 101, according to the deep features computed from the pre-trained auto-encoder (refer again to the visualizations set forth at FIGS. 1A, 1B, and 1C). So as to attain an appropriate balance between diversity and consistency of the anatomical patterns, K was empirically set to 200/1000 for 3D/2D pre-training based on the dataset size and C was set to 44/100 for 3D/2D images for the purposes of the experiment, so that the anatomical patterns can largely cover the entire image while avoiding too much overlap with each other.

For each random coordinate (elements 103, 104, 105, and 106), multi-resolution cubes/patches were extracted and then the extracted cubes/patches were all resized to 64×64× 32 for 3D images and resized to 224×224 for 2D images.

Further processing assigned C pseudo labels to the cubes/patches based on their coordinates. To pre-train Semantic Genesis 3D/2D, original cubes/patches and their pseudo labels were used as ground truths of the restoration and classification branches, respectively.

FIG. 2 depicts Table 1 at element 200 which describes the evaluation of the learned representation by fine-tuning it for six publicly-available medical imaging applications 202 including 3D and 2D image classification and segmentation tasks, across diseases, organs, datasets 205, and modalities 204.

As depicted at Table 1, the first letter of the Code 201 denotes the object of interest (e.g., "N" for lung nodule, "L" for liver, etc); the second letter of the code 201 denotes the modality (e.g., "C" for CT, "X" for X-ray, and "M" for MRI); while the last letter of the code 201 denotes the task (e.g., "C" for classification, "S" for segmentation).

Baselines and implementation: Because most self-supervised learning methods are initially proposed and implemented in 2D, experiments were extended specifically to just two of the most representative prior known techniques, but converted into their corresponding 3D versions for the sake of a fair comparison.

In addition, publicly available pre-trained models for 3D transfer learning in medical imaging were examined, including NiftyNet, MedicalNet, and Models Genesis.

An Inflated 3D (I3D) technique that is pre-trained on the Kinetics dataset and has been successfully transferred to 3D lung nodule detection was considered, as well as ImageNet models, the most influential weights initialization in 2D target tasks. A technique for solving Rubik's cube has previously been implemented as a 3D baseline. Both, the 3D U-Net architecture used in 3D applications and the U-Net architecture used in 2D applications, have been modified by appending fully-connected (fc) layers to the end of the encoders.

In proxy tasks, $\lambda_{rec}$ was set equal to 1 and $\lambda_{cls}$ was set equal to 0.01. Adam, with a learning rate of 0.001 was used for optimization. The classification branch was first trained for 20 epochs, then the entire model was jointly trained for both classification and restoration tasks. For CT target applications, capability of both 3D volume-based solutions and 2D slice-based solutions were investigated, where the 2D representation was obtained by extracting axial slices from volumetric datasets. For all applications 202, each modality 204 was run 10 times on the target task from which the average and standard deviation were reported and then further statistical analyses was presented based on independent two-sample t-test.

Figure 3:
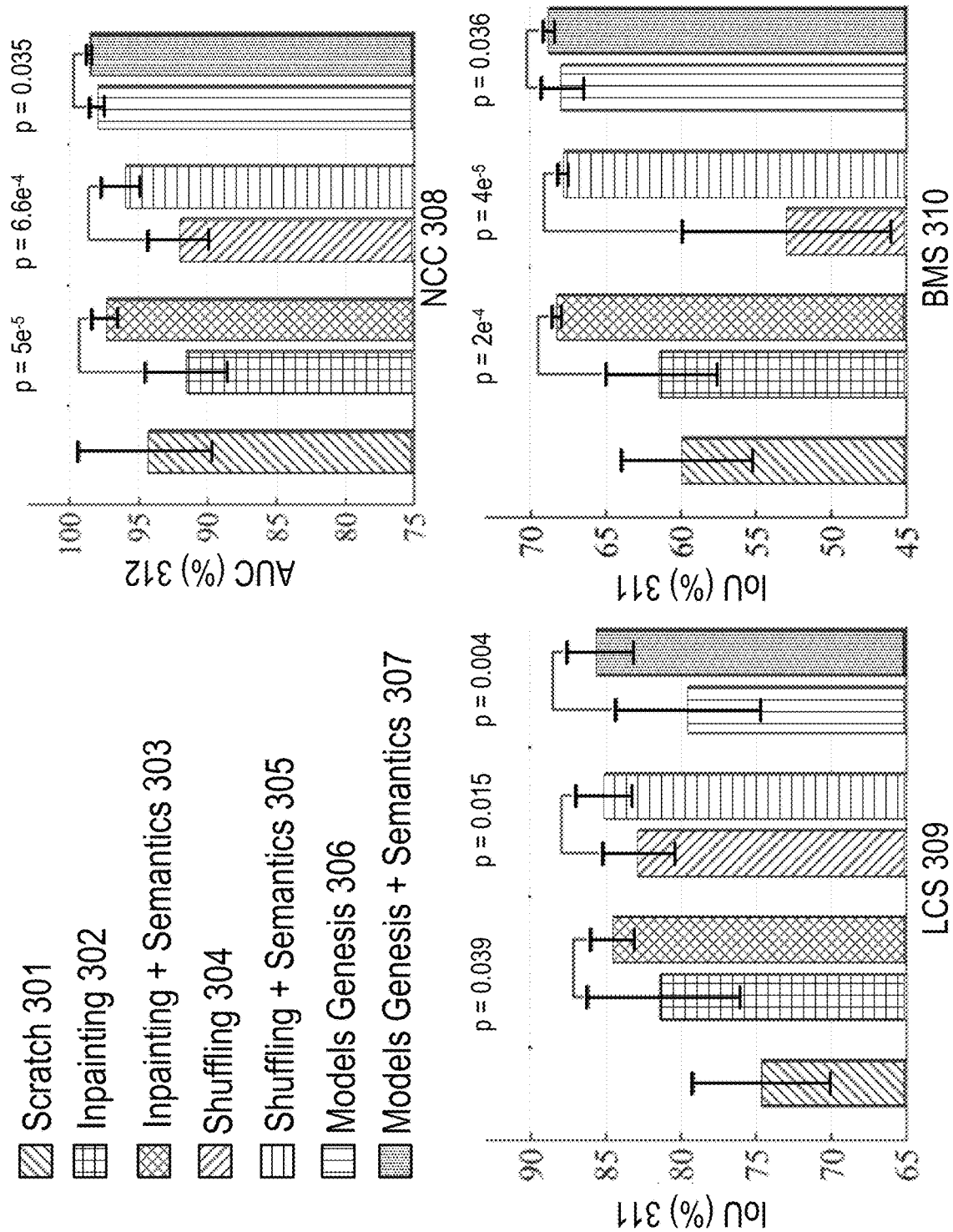
FIG. 3 charts results for both with and without semantics-enriched representation in the self-supervised learning approaches, in accordance with described embodiments.

FIG. 3 charts results for both with and without semantics-enriched representation in the self-supervised learning approaches.

Specifically depicted are the performance results for each of scratch 301, in-painting 302, in-painting+semantics 303, shuffling 304, shuffling+semantics 305 models genesis 306, and models genesis+semantics 307, for each of NCC 308 (as measured against AUC (%) 312), LCS 309 (as measured against IoU (%) 311) and BMS 310 (as measured against IoU (%) 311).

These results contrast a substantial performance difference (with p<0.05) on target classification and segmentation tasks. By introducing self-discovery and self-classification, semantics were enhanced in each of the three most recent self-supervised learning advances, specifically, image in-painting 302, patch-shuffling 304, and Models Genesis 306.

Results from Learning semantics enriches existing self-supervised learning approaches: The proposed self-supervised learning scheme should be considered as an add-on, which can be added to and boost existing self-supervised learning methods. As shown above at FIG. 3, the results indicate that by incorporating the anatomical patterns with representation learning, the semantics-enriched models consistently outperform each and every existing self-supervised learning method. Specifically, the semantics-enriched representation learning achieves performance gains by 5%, 3%, and 1% in NCC (see element 308) over scratch 301, when compared with the original in-painting 302, patch-shuffling 304, and Models Genesis 306, respectively; and the performance improved by 3%, 2%, and 6% in LCS (see element 309) and 6%, 14%, and 1% in BMS (see element 310).

From the results shown here, it is conclusively demonstrated that the described self-supervised learning scheme, by autonomously discovering and classifying anatomical patterns, learns a unique and complementary visual representation in comparison with that of an image restoration task. Through this combination, the models are made to learn from multiple perspectives, especially from the consistent and recurring anatomical structure, resulting in more powerful image representation.

FIG. 4 depicts Table 2 at element 400 which shows fine-tuning from Semantic Genesis outperforms learning 3D models from scratch as well as three competing publicly available (fully) supervised pre-trained 3D models and four self-supervised learning approaches in four medical target tasks.

As is shown here, for every target task, the mean and standard deviation (mean s.d.) are reported across ten trials. Independent two sample t-tests were further performed between the best approaches 420 (emphasized via bold text) vs. others. The results shown within the highlighted gray boxes shown no statistically significantly difference 421 at the p=0.05 level. Results are grouped based on whether pre-training was performed by either supervised 407 or self-supervised 408 learning approaches, with the second column depicting the type of initialization 402 performed, be it random 409 or specific to an available pre-trained model.

The Models Genesis denoted used only synthetic images of the BraTS-2013 dataset, however, only real and MR Flair images were examined for segmenting brain tumors, so the results were not submitted to BraTS-2018 competition.

Semantic Genesis 3D outperforms publicly available pre-trained models: A direct comparison was made of the Semantic Genesis 3D model (element 419) with the competitive publicly available pre-trained models, as applied to four distinct 3D target medical applications. Statistical analysis of the results detailed above at Table 2, suggests three major conclusions.

Firstly, compared to learning 3D models from scratch, fine-tuning from Semantic Genesis offers performance gains by at least 3%, while also yielding more stable performances in all four applications.

Secondly, fine-tuning models from Semantic Genesis achieves significantly higher performances than those fine-tuned from other self-supervised 408 approaches, in all four distinct 3D medical applications, including NCC (element 403), LCS (element 404), NCS (element 405), and BMS (element 406). In particular, Semantic Genesis surpasses Models Genesis, the state-of-the-art 3D pre-trained models created by image restoration based self-supervised learning in three applications and offers equivalent performance in NCS (element 405).

Finally, even though Semantic Genesis learns representation without using any human annotation, it was nevertheless examined and compared to 3D models pre-trained from full supervision (element 407), such as MedicalNet (element 411), NiftyNet (element 410), and Inflated 3D or "I3D" (element 412). Semantic Genesis outperformed supervised 407 pre-trained models in all four target tasks.

These experimental results evidence that in contrast to other baselines, which show fluctuation in different applications, Semantic Genesis is consistently capable of generalizing well in all tasks even when the domain distance between source and target datasets is large (e.g., LCS 404 and BMS 406 tasks). Unlike prior known techniques, Semantic Genesis explicitly benefits from the deep semantic features enriched by self-discovering and self-classifying anatomical patterns embedded in medical images, and thus contrasts with any other existing 3D models pre-trained by either self-supervision or full supervision.

Figure 5:
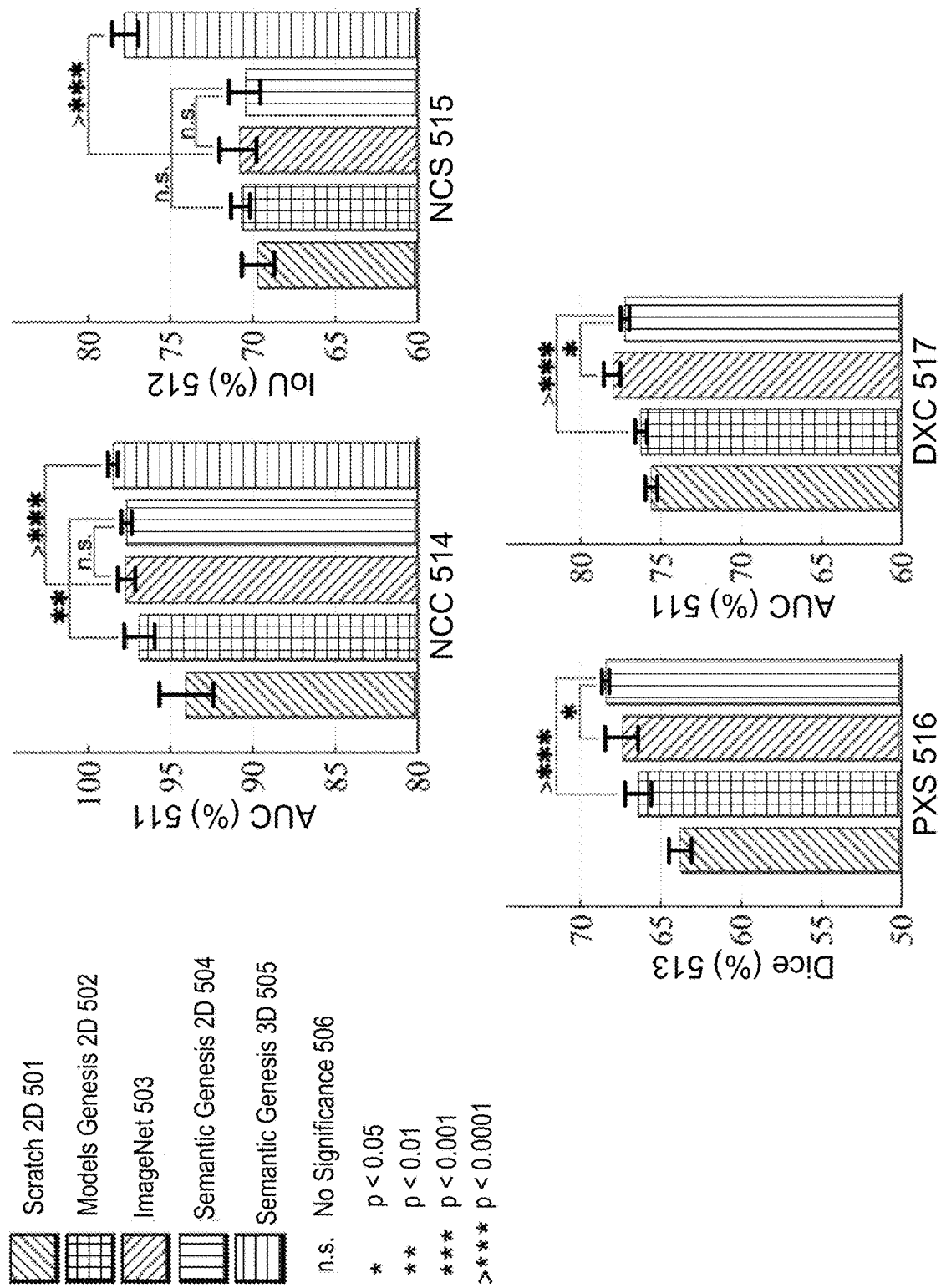
FIG. 5 shows that target tasks solved in 3D medical modality (NCC and NCS), empowered by Semantic Genesis 3D model, significantly outperformed any 2D slice-based approaches, including the state-of-the-art ImageNet models, in accordance with described embodiments.

FIG. 5 shows that target tasks solved in 3D medical modality (NCC 514 and NCS 515), empowered by Semantic Genesis 3D model, significantly outperformed any 2D slice-based approaches, including the state-of-the-art ImageNet 503 models. For target tasks in 2D modality (PXS 516 and DXC 517), Semantic Genesis 2D 504 outperforms Models Genesis 2D 502 and yielded higher performance than ImageNet 503 in PXS 517.

Semantic Genesis 3D consistently tops any 2D approaches: Despite the remarkable transferability of ImageNet models in multiple medical applications, 2D ImageNet models 503 offer little benefit to 3D medical imaging tasks in the most prominent medical modalities (e.g., CT and MRI). To fit this paradigm, 3D imaging tasks have to be reformulated and solved in 2D, and in the process, lose rich 3D anatomical information and inevitably compromise performance.

As evidenced by the results shown here for NCC 514 and NCS 515, Semantic Genesis 3D 505 outperforms all 2D solutions, including ImageNet 503 models as well as down-graded Semantic Genesis 2D 504 and Models Genesis 2D 502, demonstrating that 3D problems in medical imaging demand 3D solutions. Moreover, as an ablation study Semantic Genesis 2D 504 was examined with Models Genesis 2D 502 (self-supervised) and ImageNet models 503 (fully supervised) for four target tasks, covering classification and segmentation in CT and X-ray.

As shown here, Semantic Genesis 2D significantly surpasses training from scratch and Models Genesis 2D in all four and three applications, respectively and outperforms ImageNet model in PXS and achieves the performance equivalent to ImageNet in NCC and NCS, which is a significant achievement because all prior known self-supervised approaches lag behind fully supervised training.

Self-classification and self-restoration lead to complementary representation: Semantic Genesis benefits over prior known techniques from at least two sources, specifically pattern classification and pattern restoration. Therefore, an ablation study was further conducted to investigate the effect of each isolated training scheme. Referring again to the results at Table 2 (see FIG. 4) discussed above, the combined training scheme (Semantic Genesis 3D) consistently and significantly offers performance higher and more stable compared to each of the isolated training schemes (self-restoration and self-classification) in NCS, LCS, and BMS.

Moreover, self-restoration and self-classification reveal better performances in four target applications, on an alternating basis. These complementary results are attributed to the different visual representations that they have captured from each isolated pre-training scheme, leading to different behaviors in different target applications.

The complementary representations, in turn, confirm the importance of the unification of self-classification and self-restoration in the disclosed Semantic Genesis and its significance for medical imaging.

By designing a self-supervised learning framework that not only allows deep models to learn common visual representation from image data directly, but also leverages semantics-enriched representation from the consistent and recurrent anatomical patterns, one of a broad set of unique properties that medical imaging has to offer may be realized through practice of the disclosed embodiments. The extensive results described herein demonstrate that Semantic Genesis is superior to publicly available 3D models pre-trained by either self-supervision or even full supervision, as well as ImageNet-based transfer learning in 2D, with the outstanding results attained being attributable to the compelling deep semantics learned from abundant anatomical patterns which result from the consistent anatomies naturally embedded in medical images.

Prior known pre-trained model techniques require massive, high-quality annotated datasets. However, seldom are there perfectly-sized and systematically-labeled datasets available by which to pre-train a deep model in medical imaging, given that both data and annotations are expensive to acquire and complicated to produce. Practice of the disclosed embodiments overcome the above limitations via self-supervised learning, which allows models to learn image representation from abundant unlabeled medical image data with zero human annotation effort.

FIG. 6 depicts a flow diagram illustrating a method 600 for the generation of semantic genesis models through self-supervised learning in the absence of manual labeling, in which the trained semantic genesis models are then utilized for the processing of medical imaging, in accordance with disclosed embodiments. Method 600 may be performed by processing logic that may include hardware (e.g., circuitry, dedicated logic, programmable logic, microcode, etc.), software (e.g., instructions run on a processing device) to perform various operations such as designing, defining, retrieving, parsing, persisting, exposing, loading, executing, operating, receiving, generating, storing, maintaining, creating, returning, presenting, interfacing, communicating, transmitting, querying, processing, providing, determining, triggering, displaying, updating, sending, etc., in pursuance of the systems and methods as described herein. For example, the system 701 (see FIG. 7) and the machine 801 (see FIG. 9) and the other supporting systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 600 depicted at FIG. 6, there is a method performed by a system specially configured for the generation of semantic genesis models through self-supervised learning in the absence of manual labeling, in which the trained semantic genesis models are then utilized for the processing of medical imaging. Such a system may be configured with at least a processor and a memory to execute specialized instructions which cause the system to perform the following operations:

At block 605, processing logic performs self-supervised learning for an AI model in the absence of manually labeled input, via the following operations:

At block 610, processing logic performs a self-discovery operation which crops 2D patches or crops 3D cubes from similar patient scans received at the system as input.

At block 615, processing logic transforms each anatomical pattern represented within the cropped 2D patches or the cropped 3D cubes to generate transformed 2D anatomical patterns or transformed 3D anatomical patterns.

At block 620, processing logic performs a self-classification operation of the transformed anatomical patterns by formulating a C-way multi-class classification task for representation learning.

At block 625, processing logic performs a self-restoration operation by recovering original anatomical patterns from the transformed 2D patches or transformed 3D cubes having transformed anatomical patterns embedded therein to learn different sets of visual representation.

At block 630, processing logic provides a semantics-enriched pre-trained AI model having a trained encoder-decoder structure with skip connections in between based on the performance of the self-discovery operation, the self-classification operation, and the self-restoration operation.

According to another embodiment of method 600, performing the self-restoration operation comprises recovering the original anatomical patterns from the transformed anatomical patterns to generate recovered anatomical patterns which correspond to the 2D patches or the 3D cubes cropped from the similar patient scans received at the system as input prior to the 2D patches or the 3D cubes having undergone the transformation processing.

According to another embodiment of method 600, transforming the cropped 2D patches or the cropped 3D cubes to generate transformed 2D patches or transformed 3D cubes comprises applying one or more of the following transformations: a non-linear transformation; a local-shuffling transformation; an out-painting transformation; and an in-painting transformation.

According to another embodiment of method 600, performing the self-discovery operation of anatomical patterns further comprises: randomly anchoring one patient as a reference; and searching for the nearest neighbors to the randomly anchored patient through the entire dataset of received medical images by computing an L2 distance of the latent representation vectors to determine a set of similar patients in appearance.

According to another embodiment, method 600 further includes: extracting similar anatomical patterns from the consistent and recurring anatomies across patients represented within the received medical images according to the coordinates, each defining a unique anatomical pattern.

According to another embodiment, method 600 further includes: cropping the patches for 2D images and cropping the cubes for 3D images from C number of random but fixed coordinates across a set of discovered patients sharing similar semantics.

According to another embodiment, method 600 further includes: computing similarity at the patient-level to promote balance between the diversity and consistency of anatomical patterns.

According to another embodiment, method 600 further includes: assigning pseudo labels to the patches for 2D images and the cropped cubes for 3D images based on their coordinates, resulting in a new dataset, in which each crop is associated with one of the C classes.

According to another embodiment of method 600, each of the assigned pseudo labels carry local information defining anatomical features selected from the group of exemplary anatomical features comprising: anterior ribs 2 through 4; anterior ribs 1 through 3; right pulmonary artery; and Left Ventricle (LV). Other anatomical features may be utilized beyond the examples that are listed here.

According to another embodiment of method 600, the system comprises an auto-encoder network which is first trained with training data to extract deep features of each patient scan to learn an identical mapping from scan to itself.

According to another embodiment of method 600, once the auto-encoder network is trained, the latent representation vectors, which are extracted using the auto-encoder, are utilized as an indicator of each patient.

According to another embodiment, method 600 further includes: iteratively repeating the self-discovery operation of anatomical patterns to automatically generate anatomical patterns associated with their pseudo labels for use with a subsequent representation learning operation.

According to another embodiment of method 600, the C-way multi-class classification task causes the trained model to learn from the recurrent anatomical patterns across the plurality of medical images received at the system characterized by a deep semantically enriched representation.

According to another embodiment of method 600, the system comprises an encoder-decoder network; wherein a classification branch of the encoder-decoder network encodes the input anatomical pattern into a latent space followed by a sequence of fully-connected (fc) layers; and wherein the classification branch predicts the pseudo label associated with the pattern.

According to another embodiment of method 600, the classification branch classifies the anatomical patterns by applying a categorical cross-entropy loss function.

According to another embodiment of method 600, the system comprises an encoder-decoder network; wherein a restoration branch of the encoder-decoder network encodes the transformed anatomical pattern from the transformed 2D patches or transformed 3D cubes into a latent space; and wherein the restoration branch decodes the transformed 2D patches or transformed 3D cubes back to an original resolution from the latent space to recover each the original anatomical pattern from a corresponding transformed anatomical pattern.

According to another embodiment of method 600, the restoration branch restores the transformed anatomical patterns by computing an L2 distance between the original pattern and a reconstructed pattern via a loss function comparing the reconstructed pattern with a ground truth pattern corresponding to an original anatomical pattern represented within the medical images received by the system prior to transformation.

According to another embodiment of method 600, the training comprises applying a multi-task loss function defined on each transformed anatomical pattern as $L=\lambda_{cls}L_{cls}+\lambda_{rec}L_{rec}$, where $\lambda_{cls}$ and $\lambda_{rec}$ regulate the weights of classification and reconstruction losses, respectively.

According to another embodiment of method 600, the system comprises an encoder-decoder network; and wherein the method further comprises fine-tuning the trained encoder-decoder network for target segmentation tasks.

According to another embodiment of method 600, the system comprises an encoder-decoder network. According to such an embodiment, the method further includes fine-tuning the trained encoder-decoder network for target classification and segmentation tasks.

According to a particular embodiment, there is a non-transitory computer-readable storage medium having instructions stored thereupon that, when executed by a system having at least a processor and a memory therein, the instructions cause the system to perform operations including: cropping 2D patches or cropping 3D cubes from similar patient scans received at the system as input; transforming each anatomical pattern represented within the cropped 2D patches or the cropped 3D cubes to generate transformed 2D anatomical patterns or transformed 3D anatomical patterns; performing a self-classification operation of the transformed anatomical patterns by formulating a C-way multi-class classification task for representation learning; performing a self-restoration operation by recovering original anatomical patterns from the transformed 2D patches or transformed 3D cubes having transformed anatomical patterns embedded therein to learn different sets of visual representation; and providing a semantics-enriched pre-trained model having a trained encoder-decoder structure with skip connections in between based on the performance of the self-discovery operation, the self-classification operation, and the self-restoration operation.

Figure 7:
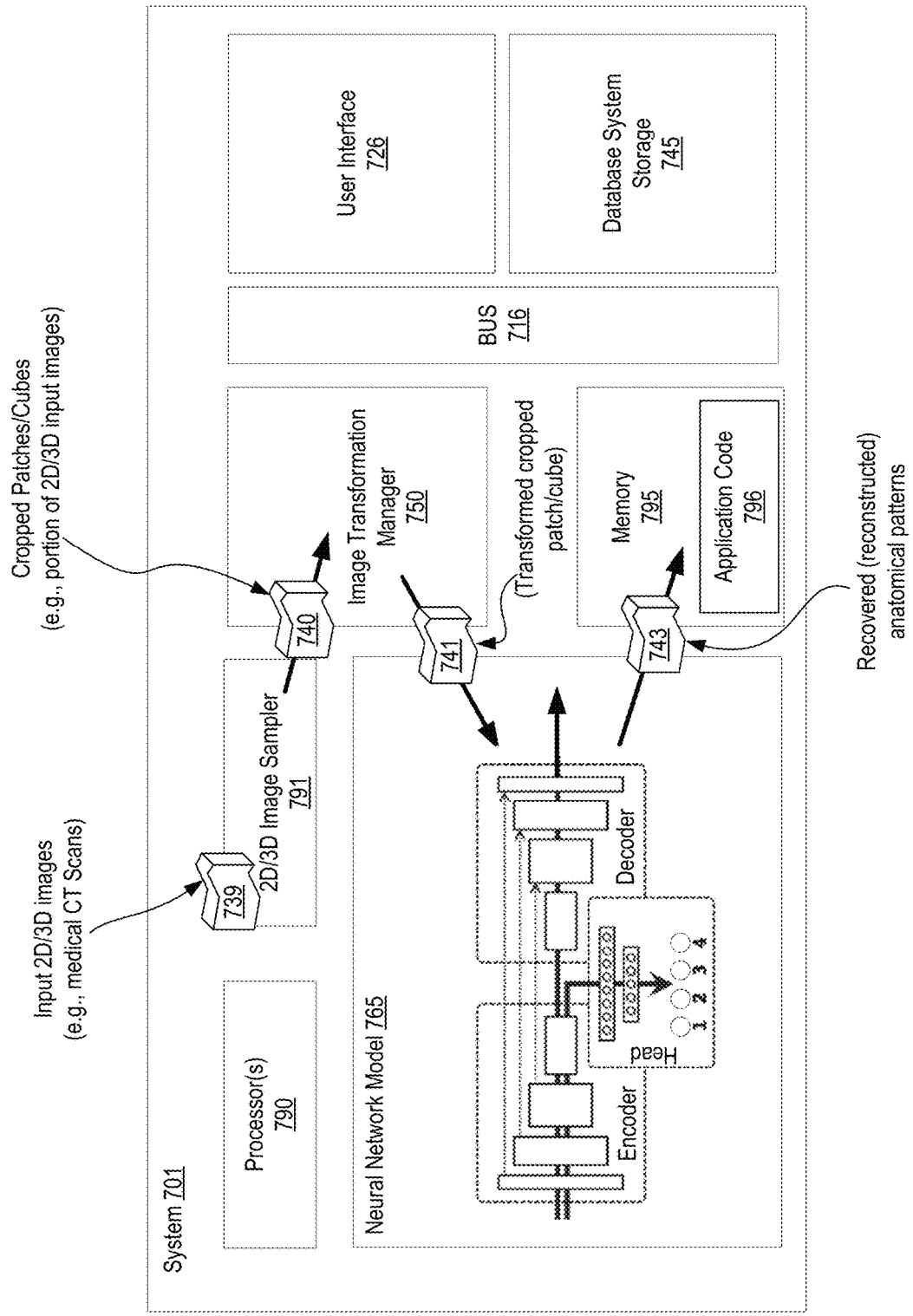
FIG. 7 shows a diagrammatic representation of a system within which embodiments may operate, be installed, integrated, or configured, in accordance with described embodiments.

FIG. 7 shows a diagrammatic representation of a system 701 within which embodiments may operate, be installed, integrated, or configured. In accordance with one embodiment, there is a system 701 having at least a processor 790 and a memory 795 therein to execute implementing application code 796. Such a system 701 may communicatively interface with and cooperatively execute with the benefit of remote systems, such as a user device sending instructions and data, a user device to receive as an output from the system 701 a semantics-enriched pre-trained model having a trained encoder-decoder structure with skip connections in between based on the performance of the self-discovery operation, a self-classification operation, and a self-restoration operation as performed by the system 701, or systems within a networked or within a client-server environment, etc.

According to the depicted embodiment, the system 701, includes the processor 790 and the memory 795 to execute instructions at the system 701. The system 701 as depicted here is specifically customized and configured to generate semantic genesis models through self-supervised learning in the absence of manual labeling, in which the trained semantic genesis models are then utilized for the processing of medical imaging, in accordance with disclosed embodiments.

According to a particular embodiment, system 701 is further configured to execute instructions via the processor for cropping a 2D patch or a 3D cube 740 from each of a plurality of medical images 739 received at the system 701 as input. The system 701 is further configured to execute instructions via the processor for performing a self-discovery operation (e.g., via the neural network model 765), in which the self-discovery operation crops 2D patches or crops 3D cubes (for instance, via an image transformation manager 750) from similar patient scans received at the system as input. The system 701 is further configured to execute instructions via the processor for transforming each anatomical pattern represented within the cropped 2D patches or the cropped 3D cubes 741 to generate transformed 2D anatomical patterns or transformed 3D anatomical patterns. The system 701 is further configured to execute instructions via the processor for performing a self-classification operation of the transformed anatomical patterns by formulating a C-way multi-class classification task for representation learning. The system 701 is further configured to perform a self-restoration operation by recovering original anatomical patterns from the transformed 2D patches or transformed 3D cubes having transformed anatomical patterns embedded therein to learn different sets of visual representation. The system 701 is further configured to provide a semantics-enriched pre-trained model having a trained encoder-decoder structure with skip connections in between based on the performance of the self-discovery operation, the self-classification operation, and the self-restoration operation.

The model output manager 785 may further transmit output back to a user device or other requestor, for example, via the user interface 726, or such information may alternatively be stored within the database system storage 745 of the system 701.

According to another embodiment of the system 701, a user interface 726 communicably interfaces with a user client device remote from the system and communicatively interfaces with the system via a public Internet.

Bus 716 interfaces the various components of the system 701 amongst each other, with any other peripheral(s) of the system 701, and with external components such as external network elements, other machines, client devices, cloud computing services, etc. Communications may further include communicating with external devices via a network interface over a LAN, WAN, or the public Internet.

Figure 8A:
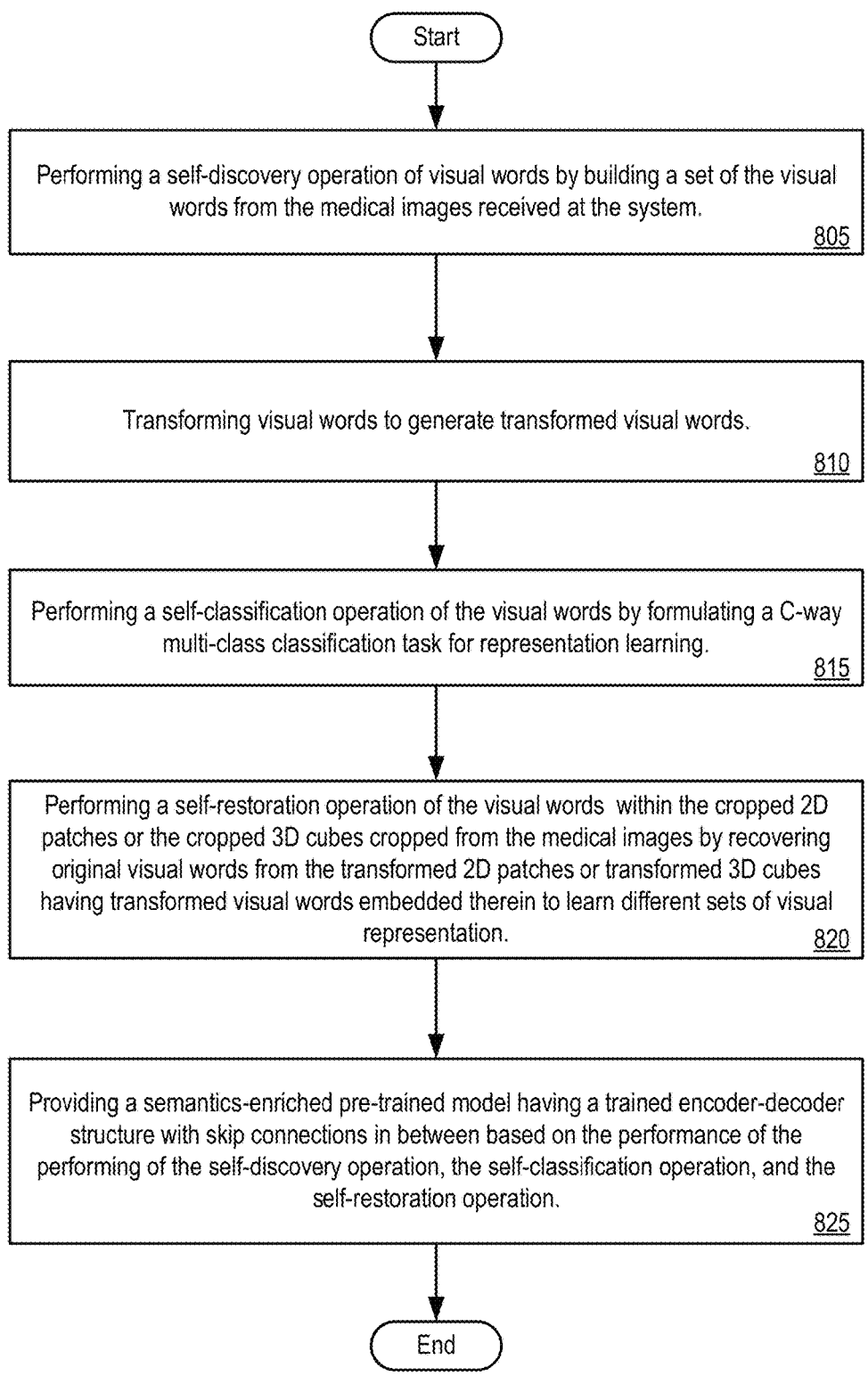
FIG. 8A depicts a flow diagram illustrating a method for the generation of trained AI models generally and trained deep CNN (Convolutional Neural Networks) or DCNN type models, in accordance with disclosed embodiments.

FIG. 8A depicts a flow diagram illustrating a method 800 for the generation of trained AI models generally and trained deep CNN (Convolutional Neural Networks) type models more specifically, through self-supervised learning in the absence of manual labeling, in which such models are then utilized for the processing of medical imaging, in accordance with disclosed embodiments.

With reference to the method 800 depicted at FIG. 8A, there is a method performed by a system specially configured for the generation of TransVW models through self-supervised learning in the absence of manual labeling, in which the trained TransVW models are then utilized for the processing of medical imaging. Such a system may be configured with at least a processor and a memory to execute specialized instructions which cause the system to perform the following operations:

At block 805, processing logic performs a self-discovery operation of visual words by building a set of the visual words from the medical images received at the system.

At block 810, processing logic performs transforms the self-discovered visual words to generate transformed visual words.

At block 815, processing logic performs a self-classification operation of the visual words by formulating a C-way multi-class classification task for representation learning.

At block 820, processing logic performs a self-restoration operation of the visual words by recovering original visual words from the transformed 2D patches or transformed 3D cubes having transformed visual words embedded therein to learn different sets of visual representation.

At block 825, processing logic provides a semantics-enriched pre-trained model having a trained encoder-decoder structure with skip connections in between based on the performance of the self-discovery operation, the self-classification operation, and the self-restoration operation.

According to another embodiment of method 800, performing the self-discovery operation of visual words further comprises the system having therein an auto-encoder network which is first trained with training data, which learns an identical mapping from scan to itself, to extract deep features of each patient scan.

According to another embodiment of method 800, the auto-encoder network, once trained, is utilized as a feature extractor, wherein the latent representation vector from the trained auto-encoder network is used as an indicator of each patient.

According to another embodiment of method 800, performing the self-discovery operation of visual words further comprises: randomly anchoring one patient as a reference; and searching for the nearest neighbors to the randomly anchored patient through the entire dataset of received medical images by computing an L2 distance of the latent representation vectors to determine a set of semantically similar patients.

According to another embodiment, method 800 further includes: extracting visual words from the consistent and recurring anatomies across patients represented within the received medical images according to the coordinates, each defining a unique visual word.

According to another embodiment, method 800 further includes: cropping the instances of a visual word from a random but fixed coordinate across this set of discovered patients sharing similar semantics.

According to another embodiment, method 800 further includes: assigning a unique visual word ID to the instances of the visual word.

According to another embodiment, method 800 further includes: computing similarity of the shared semantics at the patient-level to promote balance between the diversity and consistency of anatomical patterns.

According to another embodiment, method 800 further includes: iteratively repeating the self-discovery operation of visual words to automatically generate a dataset of visual words associated with their pseudo labels, which are extracted from C number of random unique coordinates for use with a subsequent representation learning operation.

According to another embodiment of method 800, transforming the visual words to generate transformed visual words comprises applying one or more of the following transformations: a non-linear transformation; a local-shuffling transformation; an out-painting transformation; and an in-painting transformation.

According to another embodiment of method 800, each of the visual words carry local information defining anatomical features selected from the group comprising: anterior ribs 2 through 4; anterior ribs 1 through 3; right pulmonary artery; and Left Ventricle (LV).

According to another embodiment of method 800, the C-way multi-class classification task causes the trained model to learn from the visual words across the plurality of medical images received at the system characterized by a deep semantically enriched representation.

According to another embodiment of method 800, the system comprises an encoder-decoder network with a classification head at the end of the encoder; wherein a self-classification branch of the network encodes the input visual word into a latent space followed by a sequence of fully-connected (fc) layers; and wherein the classification branch predicts the Visual word ID associated with the visual word.

According to another embodiment of method 800, the classification branch classifies the visual words by applying a categorical cross-entropy loss function.

According to another embodiment of method 800, the system comprises an encoder-decoder network; wherein a restoration branch of the network encodes the transformed visual words into a latent space; and wherein the restoration branch decodes the transformed visual words back to an original resolution from the latent space to recover each the original visual words from a corresponding transformed visual word.

According to another embodiment of method 800, the restoration branch restoration branch is trained by minimizing an L2 distance between original visual words and reconstructed visual words.

According to another embodiment of method 800, the training comprises applying a multi-task loss function defined on each transformed visual word as $\mathcal{L}_{SSL} = \lambda_{cls}\mathcal{L}_{cls} + \lambda_{rec}\mathcal{L}_{rec}$, where $\lambda_{cls}$ and $\lambda_{rec}$ regulate the weights of classification and reconstruction losses, respectively.

According to another embodiment of method 800, the system comprises an encoder-decoder network; and wherein the method further comprises fine-tuning the trained encoder-decoder network for target segmentation tasks.

According to another embodiment of method 800, the system comprises an encoder-decoder network; and further in which the method further includes fine-tuning the trained encoder network for target classification tasks.

Without loss of generality and for simplicity of representation, within an exemplary chest X-ray, the sophisticated anatomy of the lungs yields consistent and recurring anatomical patterns across X-rays in healthy or diseased images of lungs, which are referred to as "visual words." TransVW or "transferable visual words" is able to learn generalizable image representation from these consistent anatomical patterns without expert annotations, and transfer the learned deep model to application-specific target models.

Medical imaging protocols typically focus on bodily region of interest for specific clinical purposes, resulting in images of similar anatomy e.g., the lungs in the case of chest, exhibiting complex, consistent, and recurring patterns across acquired images (see FIG. 1); the recurrent anatomical patterns in medical images are associated with rich semantic knowledge about the human body, thereby offering great potential to foster deep semantic representation learning and produce more powerful models for various medical applications. Described methodologies therefore leverage the concept that the sophisticated, recurrent patterns in medical images are anatomical visual words, which can be automatically discovered from unlabeled medical image data, serving as strong yet free supervision signals for deep convolutional neural networks (DCNN) to learn disentangled representations, which are not biased to idiosyncrasies of the pre-training task and/or dataset, via self-supervised learning.

Through the application of the above described self-supervised learning framework, described methodologies therefore apply and perform (a) self-discovery, (b) self-classification, and (c) self-restoration of visual words for learning general-purpose image representations.

For instance, first, a pre-trained feature extractor $\Phi(.)$ (e.g., an auto-encoder) is utilized to compute deep latent feature vectors of unlabeled training images. Then, for discovering each visual word, processing selects a random reference patient, finds similar patients based on deep latent features, crops instances of visual word from a random yet fixed coordinate, and assigns a unique visual word ID to them. Instances of visual words may be extracted at different random coordinates and yet exhibit great similarity and consistency among discovered instances of each visual word across instances.

As an output, the described self-discovery methodology automatically generates a curated dataset of visual words associated with semantically meaningful labels, providing a free and rich source for training deep models to learn semantic representations. In order to do so, processing perturbs visual words with g(.), and give the perturbed visual words as input to an encoder-decoder network with skip connections in between and a classification head at the end of the encoder. Further processing then trains the network to learn a diverse and high-level representation by classifying visual word IDs and restoring the original visual words, resulting in more comprehensive pre-trained models, named TransVW.

Thus, according to such embodiments, an exemplary self-supervised learning framework has three components: (1) A novel self-discovery scheme that automatically builds a well-balanced and diversified dataset of visual words, associated with semantically meaningful labels, directly from medical images, (2) A unique self-classification branch, with a small computational overhead, compels the model to learn semantics from the consistent and recurring visual words discovered during the self-discovery phase, and (3) A self-restoration branch that leverages the context of visual words for learning complementary representation to that learned from the self-discovery and self-classification.

The resulting framework may thus be referred to as transferable visual words (TransVW) since the learned image representations through visual words can be transferred to a broad variety of target tasks providing a novel scalable unsupervised approach to automatically build a set of anatomical visual words from unlabeled medical images in any modality and a new pretext task that, when utilized, results in an annotation-efficient pre-trained model, which achieves better performance than prior known models, reduces training time, and reduces the annotation efforts required in comparison with previously known the state-of-the-art (SOTA) methodologies.

Figure 8B:
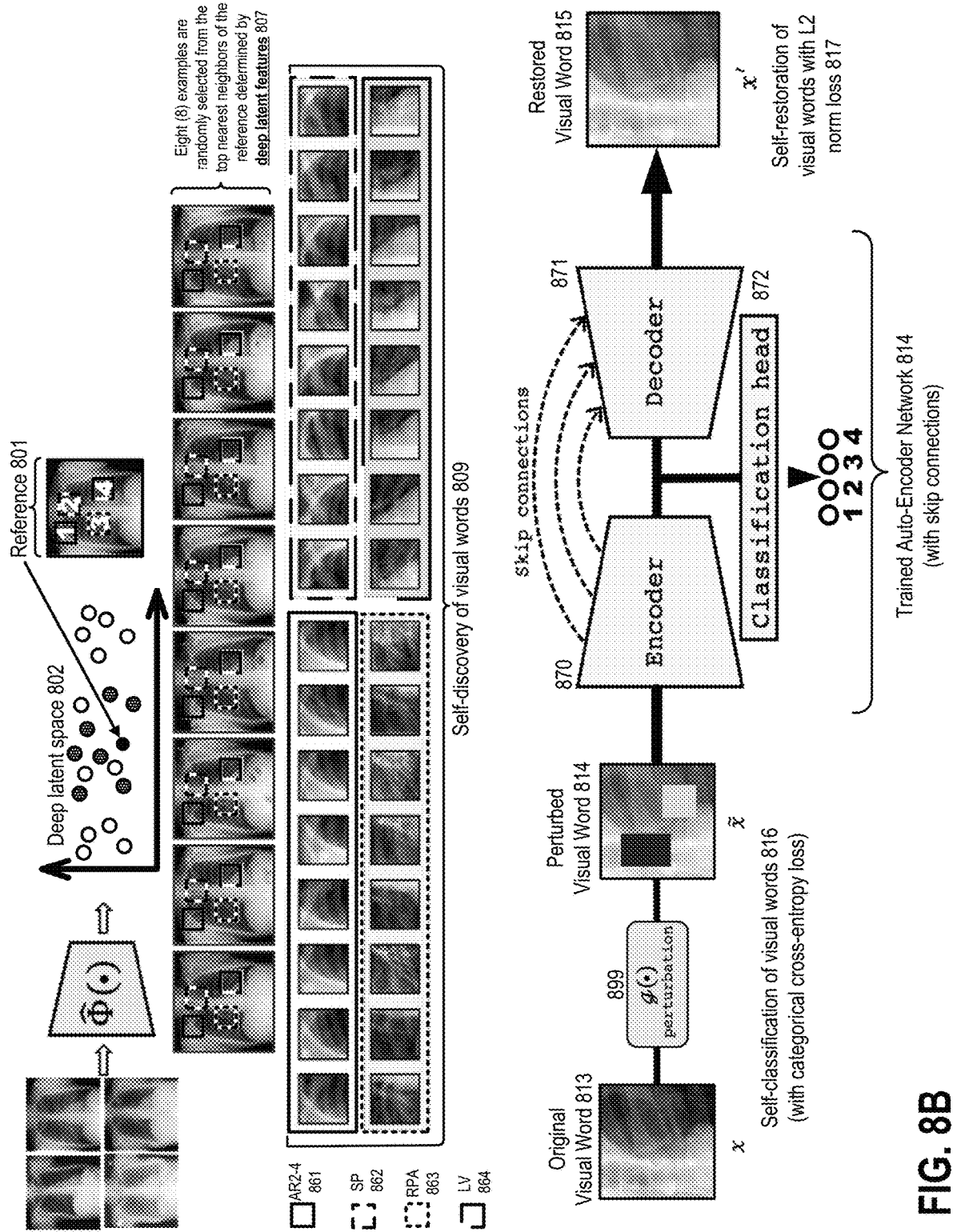
FIG. 8B depicts a self-supervised learning framework that exploits three discreet components, namely, (a) self-discovery, (b) self-classification, and (c) self-restoration of visual words for learning general-purpose image representations.

FIG. 8B depicts a self-supervised learning framework that exploits three discreet components, namely, (a) self-discovery of visual words at element 809, (b) self-classification of visual words at element 816, and (c) self-restoration of visual words with L2 norm loss at element 817 for learning general-purpose image representations.

TRANSFERABLE VISUAL WORDS: A unique property of medical images is the consistent and recurring patterns across images within a dataset, which can be considered as anatomical visual words (see FIG. 1A). For clarity, a visual word is defined as a segment of consistent and recurrent anatomical pattern, and instances of a visual word as image cubes/patches (samples) extracted across different 3D/2D images for the same visual word. Naturally, all instances of the same visual word exhibit great similarity and consistency in appearance. As illustrated in FIG. 8B and similar to that which is presented at FIG. 1A, TransVW is a simple encoder-decoder pipeline with skip connections in between, and a classification head at the end of the encoder, with an aim to distill general-purpose image representations from the consistent and recurrent visual words via self-supervised learning. For learning high-level image representations, TransVW exploits three discreet functional components, namely: (1) self-discovery of visual words 809 from unlabeled medical images; (2) self-classification of visual words 816; and (3) self-restoration of visual words 815.

Self-discovery of visual words: To automatically discover visual words from unlabeled medical images, as shown in FIG. 8B, element 809, first a pre-trained network Φ(.) is leveraged to extract deep features of each (whole) patient scan in the training data. A feature extractor network may be trained by employing a variety of available unsupervised tasks.

As depicted at FIG. 8B, processing trains an auto-encoder network with training data, which learns an identical mapping from scan to itself, as it can be easily implemented, and has shown great potential in learning data representations. The deep latent representation vectors, which are obtained from the feature extractor network, may then be utilized as an indicator of each patient.

For each visual word, one patient is randomly selected as a reference 801 and then further processing searches through the entire dataset for the nearest neighbors of the reference 801 (e.g., the one patient randomly selected) by computing the L2 distance of the latent representation vectors, resulting in a set of semantically similar patients. As shown in FIG. 8B, element 807, due to the consistent and recurring anatomies across these patients, that is, each coordinate contains a unique anatomical pattern, it is feasible to extract similar anatomical patterns according to the coordinates. Therefore, further processing crops instances of the visual word around a random but fixed coordinate across this small set of discovered patients, which share similar semantics. As shown here, eight (8) examples are randomly selected from the top nearest neighbors of the reference 801 as determined by the deep latent features 807.

Finally, a unique visual word ID is assigned to the instances of the visual word and the self-discovery component computes similarities at the patient-level rather than the pattern-level to ensure the balance between the diversity and consistency of anatomical patterns. Processing repeats this process to build a set of visual words, which are extracted from C number of random unique coordinates.

Visual words are associated with rich local semantics of the human body. As shown here, four visual words (861, 862, 863, and 864) are defined randomly in a reference patient (top-left most), where they carry local information of anterior ribs 2-4 at element 861, spinous processes at element 862, right pulmonary artery at element 863, and Left Ventricle (LV) at element 864. Hence, the self-discovery automatically generates a large-scale, well-balanced, and diversified dataset of visual words associated with their semantic pseudo labels, which provides a free and rich source for training deep models to learn semantic representations from medical images.

Self-classification of visual words: Processing next formulates the representation learning as the task of discriminating visual words based on their semantic pseudo labels, i.e., visual word IDs, through a C-way multi-class classification task.

The rational behind such a self-classification task is that discrimination of visual words requires the model to capture semantic information related to the patterns within visual words, resulting in high-level image representations associated with the anatomy underneath medical images.

As is further illustrated at FIG. 8B, at element 816, the classification branch is composed of an encoder 870, which captures the input visual word into a latent representation space, followed by a classification head 872 (including a sequence of fully-connected layers) for predicting the visual word ID associated with the input visual word. According to such embodiments, the classification branch is trained by minimizing the standard categorical cross-entropy loss function, defined as follows:

$$\mathcal{L}_{cls} = -\frac{1}{B}\sum_{b=1}^{B}\sum_{c=1}^{C}\mathcal{Y}_{bc}\log\mathcal{P}_{bc},$$

where B denotes the batch size; C denotes the number of visual words classes; y and P represent the ground truth (one-hot pseudo label vector obtained from visual word IDs) and the network prediction, respectively.

Self-restoration of visual words: Given that learning to reconstruct visual patterns has shown impressive results in self-supervised learning ("SSL")—the TransVW is equipped with the advantages of reconstruction-based approaches in representation learning.

Specifically, the self-restoration branch depicted here seeks to learn the context of visual words through a reconstruction task, which recovers the original visual words from the perturbed ones.

As is shown in FIG. 8B, at element 817, the restoration branch is an encoder-decoder (elements 870 and 871) with skip connections in-between, in which the encoder 870 is shared among the classification 816 and restoration 817 branches. According to described embodiments, processing applies a perturbation operator g(.) at element 899 on a visual word x as depicted at element 813 to get the perturbed visual word x̃=g(x) as depicted at element 814. Next, the encoder 870 takes the input perturbed visual word x̃ at element 814, and generates a latent representation. The decoder 871 then takes the latent representation from the encoder 870, and decodes it to produce the original visual word as depicted at restored visual words 815 which corresponds to the original visual word at element 813.

According to described embodiments, the perturbation operator g(.) at element 899 consists of non-linear, local-shuffling, out-painting, and in-painting transformations as well as identity mapping (i.e., x=g(x)). The role presented by such an operator is to enable the model to learn different sets of visual representations by restoring from various sets of image perturbations. The restoration branch is trained by minimizing L2 distance between original and reconstructed visual words, defined as follows:

$$\mathcal{L}_{rec} = \frac{1}{B}\sum_{i=1}^{B}\|x_i - x'_i\|_2,$$

where B denotes the batch size, x and x' represent the original visual word and the reconstructed prediction, respectively.

Full training objective: According to described embodiments, a multi-task objective function is formulated on each perturbed visual word for simultaneously training the classification and restoration branches as follows:

$$\mathcal{L}_{SSL} = \lambda_{cls}\mathcal{L}_{cls} + \lambda_{rec}\mathcal{L}_{rec},$$

where $\lambda_{cls}$ and $\lambda_{rec}$ adjust the weights of classification and restoration losses, respectively.

In such a way, the self-supervised learning scheme efficiently benefits from multiple sources of information to learn complementary representations, leading to more powerful models for a variety of medical applications. Specifically, the unique definition of $L_{cls}$ encourages the model to learn semantic knowledge about the anatomy underneath medical images through semantic labels of visual words as a strong discriminative signal. The definition of $L_{rec}$ encourages the model to learn the context of visual words from multiple perspectives by restoring original visual words from varying image perturbations.

TransVW provides superior transfer learning performance: Self-supervised learning methods aim to learn representations from data without intervention of human supervision. A good representation transfers to many different target tasks. To evaluate the generalization ability of TransVW, TransVW was fine-tuned on five 3D target applications covering semantic classification and segmentation across diseases, organs, and modalities. TransVW was then compared with training from scratch, five self-supervised baselines, and three publicly available supervised pre-trained 3D models. The first observation from these results is that TransVW outperforms training from scratch in all five applications with a significant margin, demonstrating the effectiveness of transfer learning in 3D medical imaging. Secondly, TransVW surpasses all self-supervised counterparts in all five target applications. Specifically, TransVW significantly outperforms Models Genesis in three applications (e.g., NCC, LCS, and BMS), and offers equivalent performance in ECC and NCS. Moreover, TransVW outperforms Rubik's cube, the most recent 3D multi-task self-supervised method, in all five applications, consistently and significantly. Finally, TransVW was compared with publicly available pre-trained 3D models, i.e., NiftyNet, MedicalNet, and I3D. The results demonstrate that TransVW achieves superior performance in comparison with its supervised counterparts in all five target applications.

It may therefore be concluded that TransVW provides more transferable feature representations in comparison to the self-supervised and supervised 3D competitors. This performance is ascribed to the power of visual words as a unique and deep self-supervision signal in training 3D models.

TransVW accelerates the training process: Transfer learning receives great attention because it enables a DCNN to be converged faster by just using fewer labeled data in comparison with training from scratch. The underlying assumption here is that the source task (pretext task) is trained on a large-scale dataset, such as ImageNet, and the learned representations can be generalized well to the target tasks. Therefore, a good network initialization mitigates the vanishing and exploding gradient problems at the training time and can improve the performance of a target task impressively.

Although training deep 3D models requires large quantities of annotated data, there is not yet a perfectly-sized and systematically labeled dataset, such as ImageNet in 2D, for pre-training deep 3D models in medical imaging, where both data and annotations are expensive to acquire. Hence, training a 3D model from scratch is still a popular strategy in 3D medical image analysis. Recent studies in medical domain, tried to overcome this limitation via proposing 3D pre-trained models as a powerful warm-up initialization of deep models in order to boost the performance of target tasks.

Although accelerating the training of deep neural networks is arguably one of the most influential lines of research, its importance is often underappreciated in the transfer learning literature in medical domain.

Evaluation results demonstrate that initializing 3D models from TransVW saves the training time in comparison with training from scratch in comparison with prior known techniques. These results imply that TransVW captures representations that are more aligned with the subsequent target tasks, leading to fast convergence of the target models. More importantly, TransVW significantly outperforms previously known techniques in terms of both performance and saving training time in three out of five applications, i.e., NCC, LCS, and BMS, and achieves equivalent performance with Models Genesis in NCS and ECC but in remarkably less time. Therefore, TransVW can serve as a primary source of transfer learning for 3D medical imaging applications to boost the performance and accelerate the training.

TransVW reduces the annotation cost: Self-supervised learning seeks to address the annotation challenge associated with medical imaging by leveraging the unlabeled data to learn knowledge about the medical images. Specifically, the learned knowledge can be reused in different target tasks through transfer learning, which eventually reduces the amount of labeled data in the supervised target tasks compared with learning from scratch. It is because a good representation should not need many samples to learn about a concept.

Experiments were thus conducted on partial labeled data to investigate whether TransVW reduces annotation efforts in comparison with training from scratch, as the lower bound, and fine-tuning from Models Genesis, as the SOTA. Further evaluation investigated the portion of data where TransVW achieves equivalent performance (based on independent two-sample t-test) with training from scratch as well as Models Genesis using the entire of training data. Experiments demonstrate that using only 35% of training data, TransVW achieves equivalent performance to training from scratch using 70% of data. Therefore, around 50% of the annotation cost in NCC can be reduced by fine-tuning models from TransVW compared with training from scratch. In general, transfer learning from TransVW reduces the annotation cost by 50%, 50%, 57%, 60%, and 80% in comparison with training from scratch in NCC, NCS, ECC, LCS, and BMS applications, respectively.

The disclosed TransVW techniques therefore benefit explicitly from the deep semantic features captured by self-discovery and self-classification of visual words, thus provides more general and transferable features compared with prior known techniques.

Comparing individual self-supervision tasks: The TransVW takes the advantages of two sources in representation learning, specifically: self-classification and self-restoration of visual words. Therefore, further evaluations investigated whether joint-task learning in TransVW produces more transferable features in comparison with isolated training schemes.

Ablation studies on 2D applications: To evaluate the TransVW 2D in comparison with Models Genesis 2D (self-supervised) and ImageNet (fully-supervised) pre-trained models from different perspectives, two experimental settings were further considered: (1) linear evaluation on top of the fixed features from the pre-trained network, and (2) full fine-tuning of the pre-trained network in different target tasks.

Linear evaluation: To evaluate the quality of the learned representations, common practices were followed to train linear classifiers on top of the fixed features obtained from various layers of the pre-trained networks. Based on the results, TransVW 2D representations are transferred better across all the layers on both target tasks in comparison with Models Genesis 2D and ImageNet, demonstrating the generalizability of TransVW 2D representations. Specifically, in thorax diseases classification (DXC), which is on the same dataset as the pretext task, the best performing features are extracted from res4 in the last layer of the TransVW 2D network. This indicates that TransVW 2D encourages the models to squeeze out high-level representations, which are aligned with the target task, from unlabeled data in the deeper layers of the network. Moreover, in lung nodule false positive reduction (NCC), which presents domain shift compared with pretext task, TransVW 2D remarkably reduces the performance gap between res3 and res4 features compared with Models Genesis 2D and ImageNet. This suggests that TransVW reduces the over-fitting of res4 features to the pretext task and dataset, resulting in more generalize features.

Full fine-tuning: TransVW 2D was fine-tuned for three 2D target tasks, covering classification (DXC and NCC) and segmentation (PXS) in X-ray and CT, to evaluate not only the quality of representations but also the initialization and optimization provided by the TransVW 2D.

Self-supervised learning: A broad variety of self-supervised methods have been proposed for pre-training DCNNs in natural images domain. However, self-supervised learning is a relatively new trend in medical imaging domain. Recent works including colorization of colonoscopy images, anatomical positions prediction within cardiac MR images, context restoration, and Rubik's cube recovery are developed individually for specific target tasks, without generalization ability over multiple tasks. TransVW distinguishes itself from all other existing works by explicitly employing the strong yet free semantic supervision signals of visual words, leading to a generic pre-trained model effective for various target tasks.

While described embodiments utilize the transformations of Models Genesis methodology practice of the described embodiments show significant advancement over Models Genesis in at least three ways. First, Models Genesis has only one self-restoration component, while the described embodiments introduce two more novel components: self-discovery and self-classification, which are sole factors in the performance gain. Second, the described embodiments and proposed methodology learns semantic representation from the consistent and recurring visual words discovered during our self-discovery phase, but learns representation from random sub-volumes with no semantics, as no semantics can be discovered from random sub-volumes. Finally, the described embodiments and proposed methodology serves as an add-on for boosting other self-supervised methods, while Models Genesis do not offer such advantages.

It is therefore in accordance with the above described embodiments that a key contribution of provided by the described methodologies is the ability for designing a self-supervised learning framework that not only allows deep models to learn common visual representation from image data directly, but also leverages semantics-enriched representation from the consistent and recurrent anatomical patterns, one of a broad set of unique properties that medical imaging has to offer. The extensive results provided demonstrate that TransVW is an Annotation-efficient method since it achieves better performance, accelerates the training process, and reduces the annotation efforts in comparison with publicly available 3D models pre-trained by either self-supervision or even full supervision. Moreover, TransVW can be used as an add-on scheme to substantially improve previous self-supervised methods. The outstanding results demonstrated are attributed to the compelling deep semantics learned from abundant anatomical patterns resulted from consistent anatomies naturally embedded in medical images.

FIG. 9 illustrates a diagrammatic representation of a machine 901 in the exemplary form of a computer system, in accordance with one embodiment, within which a set of instructions, for causing the machine/computer system 901 to perform any one or more of the methodologies discussed herein, may be executed.

In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify and mandate the specifically configured actions to be taken by that machine pursuant to stored instructions. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 901 includes a processor 902, a main memory 904 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 918 (e.g., a persistent storage device including hard disk drives and a persistent database and/or a multi-tenant database implementation), which communicate with each other via a bus 930. Main memory 904 includes an encoder-decoder network 924 (e.g., such as an encoder-decoder implemented via a neural network model) for performing self-learning operations on transformed 3D cropped samples provided via the cropped sample transformation manager 923, so as to pre-train an encoder-decoder network within a semantics enriched model 925 for use with processing medical imaging in support of the methodologies and techniques described herein. Main memory 904 and its sub-elements are further operable in conjunction with processing logic 926 and processor 902 to perform the methodologies discussed herein.

Processor 902 represents one or more specialized and specifically configured processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 902 may also be one or more special-purpose processing devices such as an application-specific integrated circuit (ASIC), a field programmable gate array (FPGA), a digital signal processor (DSP), network processor, or the like. Processor 902 is configured to execute the processing logic 926 for performing the operations and functionality which is discussed herein.

The computer system 901 may further include a network interface card 908. The computer system 901 also may include a user interface 910 (such as a video display unit, a liquid crystal display, etc.), an alphanumeric input device 912 (e.g., a keyboard), a cursor control device 913 (e.g., a mouse), and a signal generation device 916 (e.g., an integrated speaker). The computer system 901 may further include peripheral device 936 (e.g., wireless or wired communication devices, memory devices, storage devices, audio processing devices, video processing devices, etc.).

The secondary memory 918 may include a non-transitory machine-readable storage medium or a non-transitory computer readable storage medium or a non-transitory machine-accessible storage medium 931 on which is stored one or more sets of instructions (e.g., software 922) embodying any one or more of the methodologies or functions described herein. The software 922 may also reside, completely or at least partially, within the main memory 904 and/or within the processor 902 during execution thereof by the computer system 901, the main memory 904 and the processor 902 also constituting machine-readable storage media. The software 922 may further be transmitted or received over a network 920 via the network interface card 908.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims is to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A system comprising:
    a memory to store instructions;
    a processor to execute the instructions stored in the memory;
    a receive interface to receive a plurality of unlabeled medical images obtained from a plurality of human patients;
    wherein the system is specially configured to perform self-supervised learning for an artificial intelligence (AI) model having a trained encoder-decoder structure with skip connections in between and a classification head at an output of the encoder portion, and preceding a decoder portion, of the trained encoder-decoder structure, by executing the instructions via the processor for:
    performing a self-discovery operation that crops two-dimensional (2D) patches or crops three-dimensional (3D) cubes representing a plurality of unique anatomical patterns each reoccurring at a respective one of a plurality of unique fixed coordinates across the plurality of unlabeled medical images, and assigns one of a plurality of pseudo labels to each of the cropped 2D patches or 3D cubes based on their respective unique fixed coordinates across the plurality of unlabeled medical images;
    transforming each of the cropped 2D patches or the cropped 3D cubes to generate transformed 2D anatomical patterns or transformed 3D anatomical patterns (hereinafter "the transformed anatomical patterns");
    performing a self-classification operation on the transformed anatomical patterns to learn semantically enriched visual representations of a human body derived from the plurality of unique anatomical patterns each reoccurring at the respective one of the plurality of unique fixed coordinates across the plurality of unlabeled medical images by formulating a multi-class classification task on the plurality of pseudo labels;
    performing a self-restoration operation by recovering anatomical patterns from the transformed anatomical patterns to learn different sets of the semantically enriched visual representations of the human body.

2. The system of claim 1, wherein transforming each of the cropped 2D patches or the cropped 3D cubes to generate the transformed anatomical patterns comprises applying one or more of the following transformations to each of the cropped 2D patches or the cropped 3D cubes:
    a non-linear transformation;
    a local-shuffling transformation;
    an out-painting transformation; and
    an in-painting transformation.

3. The system of claim 1, wherein performing the self-discovery operation further comprises:
    randomly anchoring one of the plurality of human patients as a reference in the plurality of unlabeled medical images; and
    searching the plurality of unlabeled medical images for nearest neighbors to the randomly anchored human patient by computing an distance of latent representation vectors to determine a set of human patients similar in appearance.

4. The system of claim 1, wherein performing the self-discovery operation that assigns one of the plurality of pseudo labels to each of the cropped 2D patches or 3D cubes based on their respective one of a plurality of unique fixed coordinates across the plurality of unlabeled medical images, results in a new dataset, in which each cropped 2D patch and cropped 3D cube is associated with one of a plurality of classes of visual words.

5. The system of claim 1, wherein the system further comprises an auto-encoder network which is first trained with training data to extract deep features of each of the plurality of unlabeled medical images to learn an identical mapping from each unlabeled medical image to itself.

6. The system of claim 1, wherein the self-classification operation causes the AI model to learn from the unique anatomical patterns each reoccurring at the respective one of the plurality of fixed coordinates across the plurality of unlabeled medical images characterized by a deep semantically enriched visual representation of the human body.

7. The system of claim 1:
    wherein a classification branch of the encoder-decoder structure encodes the plurality of unique anatomical patterns into a latent space followed by a sequence of fully-connected (fc) layers; and
    wherein the classification branch predicts the pseudo labels assigned to the cropped 2D patches and cropped 3D cubes representing the plurality of unique anatomical patterns.

8. The system of claim 1:
    wherein a restoration branch of the encoder-decoder structure encodes the transformed anatomical patterns generated in the transforming operation into a latent space; and
    wherein the restoration branch decodes the transformed anatomical patterns to an original resolution from the latent space to recover each of the plurality of unique anatomical patterns from the corresponding transformed anatomical pattern.

9. The system of claim 1, wherein a restoration branch of the encoder-decoder structure restores the transformed anatomical patterns by computing a distance between each unique anatomical pattern and a reconstructed anatomical pattern via a loss function comparing the reconstructed anatomical pattern with a ground truth pattern corresponding to an anatomical pattern obtained from the plurality of unlabeled medical images.

10. The system of claim 1, further comprising the AI model applying a multi-task loss function defined on each transformed anatomical pattern as $L=\lambda_{cls}L_{cls}+\lambda_{rec}L_{rec}$, where $\lambda_{cls}$ and $\lambda_{rec}$ regulate weights of classification and reconstruction losses, respectively.

11. The system of claim 1:
wherein the system is further configured to perform operations including one or both of (i) fine-tuning the trained encoder-decoder structure for target classification and segmentation tasks.

12. The system of claim 4 wherein each of the assigned pseudo labels carries information about the unique anatomical features each reoccurring at the respective one of the plurality of fixed coordinates across the plurality of unlabeled medical images, the information selected from a group of unique anatomical features consisting of:
anterior ribs 2 through 4;
anterior ribs 1 through 3;
a right pulmonary artery; and
a left ventricle.

13. The system of claim 5, wherein once the auto-encoder network is trained, utilizing latent representation vectors, which are extracted using the auto-encoder, as an indicator of each of the plurality of human patients.

14. A non-transitory computer-readable storage media having instructions stored thereupon that, when executed by a system having at least a processor and a memory therein and being specially configured to perform self-supervised learning for an artificial intelligence (AI) model having a trained encoder-decoder structure with skip connections in between and a classification head at an output of the encoder portion, and preceding a decoder portion, of the trained encoder-decoder structure, the instructions cause the system to perform operations including:
receiving via an interface a plurality of unlabeled medical images obtained from a plurality of human patients;
performing a self-discovery operation that crops two-dimensional (2D) patches or crops three-dimensional (3D) cubes representing a plurality of unique anatomical patterns each reoccurring at a respective one of a plurality of unique fixed coordinates across the plurality of unlabeled medical images, and assigns one of a plurality of pseudo labels to each of the cropped 2D patches or 3D cubes based on their respective one of the unique plurality of fixed coordinates across the plurality of unlabeled medical images;
transforming each of the cropped 2D patches or the cropped 3D cubes to generate transformed 2D anatomical patterns or transformed 3D anatomical patterns (hereinafter "the transformed anatomical patterns");
performing a self-classification operation on the transformed anatomical patterns to learn semantically enriched visual representations of a human body derived from the plurality of unique anatomical patterns each reoccurring at the respective one of the plurality of unique fixed coordinates across the plurality of unlabeled medical images by formulating a classification task on the plurality of pseudo labels; and
performing a self-restoration operation by recovering anatomical patterns from the transformed anatomical patterns to learn different sets of the semantically enriched visual representations of the human body.

15. A method performed by a system having at least a processor and a memory therein to execute instructions and being specially configured to perform self-supervised learning for an artificial intelligence (AI) model having a trained encoder-decoder structure with skip connections in between and a classification head at an output of the encoder portion, and preceding a decoder portion, of the trained encoder-decoder structure, wherein the method comprises:
receiving via an interface a plurality of unlabeled medical images obtained from a plurality of human patients;
performing a self-discovery operation that crops two-dimensional (2D) patches or crops three-dimensional (3D) cubes representing a plurality of unique anatomical patterns each reoccurring at a respective one of a plurality of unique fixed coordinates across the plurality of unlabeled medical images, and assigns one of a plurality of pseudo labels to each of the cropped 2D patches or 3D cubes based on their respective one of the plurality of unique fixed coordinates across the plurality of unlabeled medical images;
transforming each of the cropped 2D patches or the cropped 3D cubes to generate transformed 2D anatomical patterns or transformed 3D anatomical patterns (hereinafter "the transformed anatomical patterns");
performing a self-classification operation on the transformed anatomical patterns to learn semantically enriched visual representations of a human body derived from the plurality of unique anatomical patterns each reoccurring at the respective one of the plurality of unique fixed coordinates across the plurality of unlabeled medical images by formulating a classification task on the plurality of pseudo labels; and
performing a self-restoration operation by recovering anatomical patterns from the transformed anatomical patterns to learn different sets of the semantically enriched visual representations of the human body.

* * * * *